(12) United States Patent
Willis et al.

(10) Patent No.: US 10,022,680 B2
(45) Date of Patent: Jul. 17, 2018

(54) ANION EXCHANGE BLOCK COPOLYMERS, THEIR MANUFACTURE AND THEIR USE

(71) Applicant: Kraton Polymers U.S. LLC, Houston, TX (US)

(72) Inventors: Carl Lesley Willis, Houston, TX (US); Irwan Hidajat, Houston, TX (US); Mike Heniff, Pearland, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 0 days.

(21) Appl. No.: 14/154,146

(22) Filed: Jan. 13, 2014

(65) Prior Publication Data

US 2014/0197032 A1    Jul. 17, 2014

Related U.S. Application Data

(60) Provisional application No. 61/752,256, filed on Jan. 14, 2013.

(51) Int. Cl.

| | |
|---|---|
| *B01D 61/44* | (2006.01) |
| *B01D 71/82* | (2006.01) |
| *B01D 65/10* | (2006.01) |
| *H01M 8/1023* | (2016.01) |
| *C08F 8/02* | (2006.01) |
| *C08F 8/24* | (2006.01) |
| *C08F 8/30* | (2006.01) |
| *C08F 8/40* | (2006.01) |
| *B01D 53/22* | (2006.01) |

(52) U.S. Cl.
CPC ............. *B01D 71/82* (2013.01); *B01D 61/44* (2013.01); *B01D 65/10* (2013.01); *C08F 8/02* (2013.01); *C08F 8/24* (2013.01); *C08F 8/30* (2013.01); *C08F 8/40* (2013.01); *H01M 8/1023* (2013.01); *B01D 53/228* (2013.01); *Y02P 70/56* (2015.11)

(58) Field of Classification Search
CPC ..... C08F 293/00; C08F 297/086; B01D 71/82
See application file for complete search history.

(56) References Cited

U.S. PATENT DOCUMENTS

| | | |
|---|---|---|
| 3,450,795 A | 6/1969 | Langer |
| 3,577,357 A | 5/1971 | Winkler |
| RE27,145 E | 6/1971 | Jones |
| 3,595,942 A | 7/1971 | Wald et al. |
| 3,634,549 A | 1/1972 | Shaw et al. |
| 3,670,054 A | 6/1972 | De La Mare et al. |
| 3,700,633 A | 10/1972 | Wald et al. |
| 3,985,830 A | 10/1976 | Fetters et al. |
| 4,039,593 A | 8/1977 | Kamienski et al. |
| 4,052,343 A | 10/1977 | Cunningham |
| 4,107,131 A | 8/1978 | Gergen et al. |
| 4,107,236 A | 8/1978 | Naylor et al. |
| 4,116,889 A | 9/1978 | Chlanda et al. |
| 4,221,642 A | 9/1980 | De Nora et al. |
| 4,231,855 A | 11/1980 | Hodgdon et al. |

(Continued)

FOREIGN PATENT DOCUMENTS

| | | |
|---|---|---|
| CA | 716645 A | 8/1965 |
| EP | 1283221 A1 | 12/2003 |

(Continued)

OTHER PUBLICATIONS

Taiwan Search Report dated Feb. 12, 2015 for corresponding Taiwan Patent Application No. 103101313.

(Continued)

*Primary Examiner* — Jeffrey C Mullis

(74) *Attorney, Agent, or Firm* — Samantha Page; Cantor Colburn LLP

(57) ABSTRACT

Selectively amino- or phosphino-functionalized block copolymers, and their preparation, for use as anion exchange membrane materials. The selectively functionalized block copolymers have at least two end blocks A each of which are substantially free of amino- or phosphino-functional groups, and have at least one interior block D which comprises on average at least one amino- or phosphino-functionalized polymer unit of formula (I)

(I)

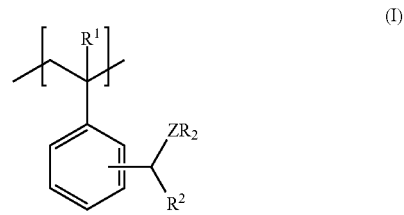

wherein

Z is nitrogen or phosphorous;

$R^1$ is hydrogen or alkyl;

$R^2$ is hydrogen or is tertiary alkyl;

R each independently, is hydrogen or is alkyl optionally substituted by a moiety $-(A^1-NR^a)_xR^b$; or two R groups, together with the Z to which they are bonded, form an optionally substituted ring;

x is 1, 2 or 3;

$A^1$ is straight chain alkylene optionally substituted by one or more methyl and/or ethyl groups; and $R^a$ and $R^b$, each independently, is hydrogen or alkyl;

or a corresponding onium salt.

14 Claims, 4 Drawing Sheets

(56) References Cited

U.S. PATENT DOCUMENTS

| | | | |
|---|---|---|---|
| 4,365,023 A | 12/1982 | Fujimoto et al. | |
| 4,373,031 A | 2/1983 | Waite | |
| 4,391,949 A | 7/1983 | St Clair | |
| 4,444,953 A | 4/1984 | St Clair | |
| 4,514,304 A * | 4/1985 | Miyaki et al. | 210/638 |
| 4,587,269 A | 5/1986 | Thomas, Jr. | |
| 4,828,941 A | 5/1989 | Sterzel | |
| 4,923,611 A | 5/1990 | Hamada et al. | |
| 5,015,862 A | 5/1991 | Holmes et al. | |
| 5,045,171 A | 9/1991 | MacDonald | |
| 5,118,717 A | 6/1992 | Hodgdon et al. | |
| 5,143,786 A * | 9/1992 | Tanaka | A61L 15/42 |
| | | | 156/180 |
| 5,180,750 A | 1/1993 | Sugaya et al. | |
| 5,350,523 A | 9/1994 | Tomoi et al. | |
| 5,468,574 A | 11/1995 | Ehrenberg et al. | |
| 5,643,490 A | 7/1997 | Takahashi et al. | |
| 5,746,917 A | 5/1998 | Altmeier | |
| 5,814,672 A | 9/1998 | Kiyokawa et al. | |
| 5,827,602 A | 10/1998 | Koch et al. | |
| 5,936,004 A | 8/1999 | Altmeier | |
| 6,183,914 B1 | 2/2001 | Yao et al. | |
| 6,388,018 B1 | 5/2002 | Peiffer et al. | |
| 6,391,981 B1 | 5/2002 | Willis et al. | |
| 6,444,767 B1 | 9/2002 | Schade et al. | |
| 6,455,651 B1 | 9/2002 | Willis et al. | |
| 6,492,469 B2 | 12/2002 | Willis et al. | |
| 6,531,241 B1 | 3/2003 | McEwen | |
| 6,646,083 B2 | 11/2003 | Hirano | |
| 6,686,423 B1 | 2/2004 | Desbois et al. | |
| 6,767,976 B2 | 7/2004 | Hamada et al. | |
| 7,026,406 B1 | 4/2006 | Kawabe et al. | |
| 7,081,484 B2 | 7/2006 | Sugaya et al. | |
| 7,169,848 B2 | 1/2007 | Bening et al. | |
| 7,592,390 B2 | 9/2009 | Bening et al. | |
| 7,601,448 B2 | 10/2009 | Hidaka et al. | |
| 7,737,224 B2 | 6/2010 | Willis et al. | |
| 7,740,968 B2 | 6/2010 | Yamashita et al. | |
| 7,785,750 B2 | 8/2010 | El Moussaoui et al. | |
| 7,968,663 B2 | 6/2011 | MacDonald et al. | |
| 8,148,030 B2 | 4/2012 | Isomura et al. | |
| 8,263,713 B2 | 9/2012 | Willis | |
| 9,061,254 B2 * | 6/2015 | Willis | B01D 61/44 |
| 9,364,825 B2 * | 6/2016 | Willis | B01D 61/44 |
| 9,365,662 B2 | 6/2016 | Willis | |
| 2006/0217569 A1 | 9/2006 | Schulze et al. | |
| 2008/0113244 A1 * | 5/2008 | Yamashita et al. | 429/33 |
| 2008/0312068 A1 | 12/2008 | Lee et al. | |
| 2009/0166295 A1 | 7/2009 | Chen et al. | |
| 2009/0263699 A1 | 10/2009 | Sadasue et al. | |
| 2010/0137460 A1 | 6/2010 | Willis et al. | |
| 2011/0086982 A1 | 4/2011 | Willis et al. | |
| 2011/0195345 A1 | 8/2011 | Hago | |
| 2011/0207028 A1 | 8/2011 | Fukuta et al. | |
| 2011/0281197 A1 | 11/2011 | Daikoku et al. | |
| 2012/0267248 A1 | 10/2012 | Willis | |
| 2013/0015071 A1 | 1/2013 | Willis | |
| 2013/0146450 A1 | 6/2013 | Kishino et al. | |

FOREIGN PATENT DOCUMENTS

| | | |
|---|---|---|
| JP | S59203641 A | 11/1984 |
| JP | 2002534543 A | 10/2002 |
| JP | 2004059781 A | 2/2004 |
| JP | 2008226614 A | 9/2008 |
| JP | 2015027157 A | 2/2016 |
| JP | 2016027157 A | 2/2016 |
| WO | 199852994 A1 | 11/1998 |

OTHER PUBLICATIONS

Vinodh et al., J. Biosci. Tech. 1(1), 45-51 (2009).

Coates, G.W. et al., Agnew, Chem. Int., Ed. 41, pp. 2236-2257, 2002.

U.S. Appl. No. 13/181,306, filed Jul. 12, 2011.

Dauben et al., J. Am. Chem. Soc. 81(18), 4863-4873 (1959).

Luo, Y., Guo, J., Wang, C., Chu, D., Tunable High-Molecular-Weight Anion-Exchange Membranes For Alkaline Fuel Cells, Macromolecular Chemistry and Physics, 2011, 212, pp. 2094-2102.

Zhou, J., Unlu, M., Vega, J.A., Kohl, P.A., Anionic Polysulfone Ionomers and Membranes Containing Fluorenyl Groups for Anionic Fuel Cells, Journal of Power Sources, 190 (2009) pp. 285-292.

Schultz, A.R., Chainika, J. and Long, T.E., "Thermal and living anionic polymerization of 4-vinylbenzyl Diperidine", Polym. Chem., 2014, 5, 6003-6011.

Chinese Search Report for CN201480004627, filed Jan. 13, 2014.

"Notice of Allowance dated Apr. 24, 2015", U.S. Appl. No. 14/333,203.

Blanc, G. et al., "Blanc Reaction", Bull. Soc. Chim. France, 33, 313 et. seq., 1923.

* cited by examiner

ANION EXCHANGE BLOCK COPOLYMERS, THEIR MANUFACTURE AND THEIR USE

FIELD OF THE INVENTION

The present disclosure relates to block copolymers which are selectively functionalized in at least one interior block by amino or phosphino groups, or corresponding onium salt groups, and which exhibit anion exchange properties. More specifically, the selectively functionalized block copolymers comprise at least two end blocks A, wherein each end block A is substantially free of amino- or phosphino-functional groups, and at least one interior block D comprising at least one amino- or phosphino-functionalized polymer unit or a corresponding onium salt.

The present disclosure also provides processes for making the functionalized block copolymers, and products comprising them. The functionalized block copolymers exhibit extraordinary properties with regard to dimensional stability, water transport and selective ion transport. Accordingly, products such as membranes which comprise the functionalized block copolymers are particularly suited as anion exchange membranes (AEMs) in applications such as electrically driven water separation processes.

BACKGROUND OF THE INVENTION

Anion exchange resins (bead form) including those suitable as materials for AEMs are known in the art. Generally, such resins are cross-linked and comprise functional groups with basic properties, such as amino groups, covalently linked to the base resin. Typically, anion exchange resins (bead form) and AEMs have been prepared by copolymerizing a divinyl monomer such as divinylbenzene or ethylene glycol dimethacrylate with a monomer already containing ion exchange groups, e.g., 2-sulfoethyl methacrylate, or with a monomer which after polymerization can be converted to contain ion exchange groups, such as styrene and methylstyrene (which can be converted to aminomethyl-substituted styrene) or dimethylaminopropylmethacrylamide (DMAPMA) (which can be converted to a quaternary ammonium halide after treatment with methyl chloride).

It is known also that styrene block copolymers (SBCs) can be functionalized in order to further modify their characteristics. An example of this is the addition of sulfonic acid or sulfonate ester functional groups to the polymer backbone (U.S. Pat. No. 3,577,357, U.S. Pat. No. 5,468,574, U.S. Pat. No. 7,737,224). Additionally, co-pending application Ser. No. 13/181,306 to Willis et al. (filed Jul. 12, 2011) describes modified sulfonated SBCs suitable as materials for AEMs in which the sulfonic acid or sulfonate ester functional groups are converted to sulfonamide functional groups. The sulfonamide functionalized SBCs of Willis et al. are proposed as membrane materials for electrically driven water separation processes in which they are paired with cation exchange membranes such as, e.g., disclosed in U.S. Pat. No. 7,737,224 to Willis et al.

However, there continues to be a need for AEMs which selectively transport ions and which, at the same time, exhibit mechanical integrity and dimensional stability.

SUMMARY OF THE INVENTION

It has now surprisingly been found that the amino- or phosphino-functionalized block copolymers disclosed herein are uniquely qualified as materials for AEMs which selectively transport ions and, at the same time, exhibit mechanical integrity and dimensional stability.

It has now surprisingly been found that the amino- or phosphino-functionalized block copolymers disclosed herein are uniquely qualified as materials for AEMs which selectively transport ions and, at the same time, exhibit mechanical integrity and dimensional stability.

In a first aspect, the present disclosure pertains to an amino- or phosphino-functionalized block copolymer comprising:
(a) at least two end blocks A, wherein each end block A is substantially free of amino- or phosphino-functional groups, has a number average molecular weight of from about 1,000 to about 60,000, and has a high service temperature; and
(b) at least one interior block D having a number average molecular weight of from about 1,000 to about 100,000 and comprising on average at least one amino- or phosphino-functionalized polymer unit of formula (I)

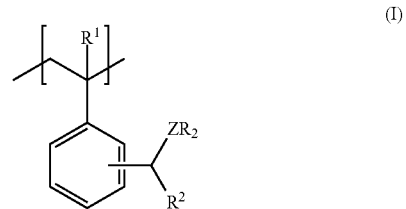

wherein
Z is nitrogen or phosphorous;
$R^1$ is hydrogen or alkyl;
$R^2$ is hydrogen or is tertiary alkyl;
R each independently, is hydrogen or is alkyl optionally substituted by a moiety $-(A^1-NR^a)_xR^b$; or
two R groups, together with the Z to which they are bonded, form an optionally substituted ring;
x is 1, 2 or 3;
$A^1$ is straight chain alkylene optionally substituted by one or more methyl and/or ethyl groups; and
$R^a$ and $R^b$, each independently, is hydrogen or alkyl;
or a corresponding onium salt.

In a second aspect, the present disclosure pertains to the functionalized block copolymer in accordance with the first aspect, wherein from about 10 to 100% of the functional groups of the block(s) D are in form of the onium salt.

In a third aspect, the present disclosure pertains to the functionalized block copolymer in accordance with either one of the foregoing aspects, wherein each block A is independently selected from the group consisting of polymerized (i) ethylene monomers; (ii) propylene monomers, (iii) styrene and alpha-alkyl styrene monomers having a phenyl ring which is optionally substituted by one or more alkyl groups, (iv) (meth)acrylate ester monomers, and (v) mixtures of monomers selected from (i) to (iv).

In a fourth aspect, the present disclosure pertains to the functionalized block copolymer in accordance with either one of the foregoing aspects, wherein each block D is independently selected from the group consisting of (i) segments derived from homo- and copolymers of styrene, (ii) segments derived from homo- and copolymers of styrene having a phenyl ring which is substituted by a primary alkyl group, (iii) segments derived from homo- and copolymer of alpha-alkyl styrene, and (iv) segments derived from homoand copolymers of alpha-alkyl styrene having a phenyl ring which is substituted by a primary alkyl group.

In a fifth aspect, the present disclosure pertains to the functionalized block copolymer in accordance with the fourth aspect, wherein on average at least about 5% of the styrene or alpha-alkyl styrene derived polymer units of each block D, are polymer units of formula (I) or the corresponding onium salt.

In a sixth aspect, the present disclosure pertains to the functionalized block copolymer in accordance with the fourth aspect, wherein on average from 25 to 100% of the styrene or alpha-alkyl styrene derived polymer units of each block D, are polymer units of formula (I) or the corresponding onium salt.

In a seventh aspect, the present disclosure pertains to the functionalized block copolymer in accordance with either one of the foregoing aspects four to six, wherein each block D consists of polymer units of formula (I), or the corresponding onium salt, and optionally polymer units derived from one or more monomers selected from the group consisting of styrene and alpha-alkyl styrene in each case having a phenyl ring which is optionally substituted by a primary alkyl group.

In an eighth aspect, the present disclosure pertains to the functionalized block copolymer in accordance with either one of the foregoing aspects which further comprises at least one interior block B, wherein each block B is essentially non-functionalized, has a number average molecular weight of from about 1,000 to about 100,000, and has a glass transition temperature of at most about 20° C.

In a ninth aspect, the present disclosure pertains to the functionalized block copolymer in accordance with the eighth aspect, wherein each block B is independently selected from the group consisting of polymerized (i) ethylene monomers, (ii) $C_3$-$C_8$ alpha-olefin monomers, (iii) isobutylene monomers, (iv) conjugated diene monomers, (v) (meth)acrylate ester monomers, (vi) a silicon polymer, and (vii) mixtures of monomers selected from (i) to (v), wherein segments containing polymerized conjugated diene monomers are optionally hydrogenated.

In a tenth aspect, the present disclosure pertains to the functionalized block copolymer in accordance with either one of the foregoing aspects eight and nine which has a general configuration A-D-A, A-D-A-D-A, (A-D-A)$_n$X, (A-D)$_n$X, A-B-D-B-A, A-D-B-D-A, (A-B-D)$_n$X, (A-D-B)$_n$X, or mixtures thereof, wherein n is an integer from 2 to about 30, and X is a coupling agent residue, and wherein the plurality of A blocks, B blocks, or D blocks are the same or different.

In an eleventh aspect, the present disclosure pertains to a membrane or film comprising the functionalized block copolymer in accordance with either one of the foregoing aspects one to ten.

In a twelfth aspect, the present disclosure pertains to an apparatus selected from the group consisting of fuel cells, filtration devices, devices for controlling humidity, devices for forward electro-dialysis, devices for reverse electro-dialysis, devices for pressure retarded osmosis, devices for forward osmosis, devices for reverse osmosis, devices for selectively adding water, devices for selectively removing water, devices for capacitive deionization, devices for molecular filtration, devices for removing salt from water, devices for treating produced water from hydraulic fracturing applications, devices for ion transport applications, devices for softening water, and batteries, which comprises the membrane or film in accordance with the eleventh aspect.

In a thirteenth aspect, the present disclosure pertains to an electro-deionization assembly comprising at least one anode, at least one cathode, and one or more membrane(s) wherein at least one membrane is the membrane in accordance with the eleventh aspect.

In a fourteenth aspect, the present disclosure pertains to the electro-deionization assembly in accordance with the thirteenth aspect which comprises at least two membranes wherein at least one membrane is a cation-exchange membrane.

In a fifteenth aspect, the present disclosure pertains to the electro-deionization assembly in accordance with either one of the foregoing aspects thirteen and fourteen, wherein the cation-exchange membrane comprises a sulfonated block copolymer comprising at least two polymer end blocks E and at least one polymer interior block F, wherein each E block contains essentially no sulfonic acid or sulfonated ester functional groups and each F block comprises sulfonation susceptible polymer units and, based on the number of the sulfonation susceptible polymer units, from about 10 to about 100 mol % of sulfonic acid or sulfonate ester functional groups.

In a sixteenth aspect, the present disclosure pertains to a selectively halogenated block copolymer comprising:
(a) at least two end blocks A, wherein each end block A is essentially non-halogenated, has a number average molecular weight of from about 1,000 to about 60,000, and has a high service temperature; and
(b) at least one interior block D* having a number average weight of from about 1,000 to about 100,000 and comprising on average at least one polymer unit of formula (II)

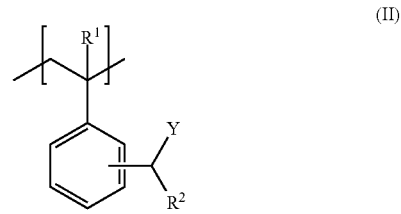

wherein
Y is halogen;
$R^1$ is hydrogen or alkyl; and
$R^2$ is hydrogen or is tertiary alkyl.

In a seventeenth aspect, the present disclosure pertains to the selectively halogenated block copolymer in accordance with the sixteenth aspect, wherein each block A is independently selected from the group consisting of polymerized (i) ethylene monomers; (ii) propylene monomers, (iii) styrene and alpha-alkyl styrene monomers having a phenyl ring which is optionally substituted by one or more alkyl groups, (iv) (meth)acrylate ester monomers, and (v) mixtures of monomers selected from (i) to (iv).

In an eighteenth aspect, the present disclosure pertains to the selectively halogenated block copolymer in accordance with either one of the foregoing aspects sixteen and seventeen, wherein each block D* is independently selected from the group consisting of (i) segments derived from homo- and copolymers of styrene, (ii) segments derived from homo- and copolymers of styrene having a phenyl ring which is substituted by a primary alkyl group, (iii) segments derived from homo- and copolymer of alpha-alkyl styrene, and (iv)

segments derived from homo- and copolymers of alpha-alkyl styrene having a phenyl ring which is substituted by a primary alkyl group.

In a nineteenth aspect, the present disclosure pertains to the selectively halogenated block copolymer in accordance with either one of the foregoing aspects sixteen to eighteen, wherein each block D* consists of polymer units of formula (II) and optionally polymer units derived from one or more monomers selected from the group consisting of styrene and alpha-alkyl styrene in each case having a phenyl ring which is optionally substituted by a primary alkyl group.

In a twentieth aspect, the present disclosure pertains to the selectively halogenated block copolymer in accordance with either one of the foregoing aspects sixteen to nineteen, wherein on average at least about 5% of the styrene or alpha-alkyl styrene derived polymer units of each block D* are polymer units of formula (II).

In a twenty-first aspect, the present disclosure pertains to the selectively halogenated block copolymer in accordance with either one of the foregoing aspects sixteen to twenty, wherein on average from about 25 to 100% of the styrene or alpha-alkyl styrene derived polymer units of each block D* are polymer units of formula (II).

In a twenty-second aspect, the present disclosure pertains to the selectively halogenated block copolymer in accordance with either one of the foregoing aspects sixteen to twenty-one which further comprises at least one interior block B, wherein each block B is essentially non-halogenated, has a number average molecular weight of from about 1,000 to about 100,000, and has a glass transition temperature of at most about 20° C.

In a twenty-third aspect, the present disclosure pertains to the selectively halogenated block copolymer in accordance with either one of the foregoing aspects sixteen to twenty-two, wherein each block B is independently selected from the group consisting of polymerized (i) ethylene monomers, (ii) $C_3-C_8$ alpha-olefin monomers, (iii) isobutylene monomers, (iv) conjugated diene monomers, (v) (meth)acrylate ester monomers, (vi) a silicon polymer, and (vii) mixtures of monomers selected from (i) to (v), wherein segments containing polymerized conjugated diene monomers are hydrogenated.

In a twenty-fourth aspect, the present disclosure pertains to the selectively halogenated block copolymer in accordance with either one of the foregoing aspects sixteen to twenty-three which has a general configuration A-D*-A, A-D*-A-D*-A, (A-D*-A)$_n$X, (A-D*)$_n$X, A-B-D*-B-A, A-D*-B-D*-A, (A-B-D*)$_n$X, (A-D*-B)$_n$X, or mixtures thereof, wherein n is an integer from 2 to about 30, and X is a coupling agent residue and wherein the plurality of A blocks, B blocks, or D* blocks are the same or different.

In a twenty-fifth aspect, the present disclosure pertains to a precursor block copolymer comprising:
(a) at least two end blocks A, wherein each end block A is substantially resistant to halogenation, has a number average molecular weight of from about 1,000 to about 60,000, and has a high service temperature; and
(b) at least one interior block D° having a number average weight of from about 1,000 to about 100,000 and comprising on average at least one polymer unit of formula (III)

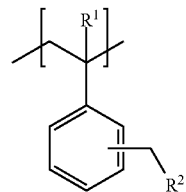

(III)

wherein
$R^1$ is hydrogen or alkyl; and
$R^2$ is hydrogen or is tertiary alkyl.

In a twenty-sixth aspect, the present disclosure pertains to the precursor block copolymer in accordance with the twenty-fifth aspect, wherein each block A is independently selected from the group consisting of polymerized (i) ethylene monomers; (ii) propylene monomers, (iii) styrene and alpha-alkyl styrene monomers having a phenyl ring which is substituted by one or more tertiary alkyl groups, (iv) (meth)acrylate ester monomers, and (v) mixtures of monomers selected from (i) to (iv).

In a twenty-seventh aspect, the present disclosure pertains to the precursor block copolymer in accordance with either one of the foregoing aspects twenty-five and twenty-six, wherein each block D° is independently selected from the group consisting of (i) homo- and copolymers of styrene, (ii) homo- and copolymers of styrene having a phenyl ring which is substituted by a primary alkyl group, (iii) homo- and copolymer of alpha-alkyl styrene, and (iv) homo- and copolymers of alpha-alkyl styrene having a phenyl ring which is substituted by a primary alkyl group.

In a twenty-eighth aspect, the present disclosure pertains to the precursor block copolymer in accordance with either one of the foregoing aspects twenty-five to twenty-seven, wherein each block D° consists of polymer units of formula (III) and optionally polymer units derived from one or more monomers selected from the group consisting of styrene and alpha-alkyl styrene.

In a twenty-ninth aspect, the present disclosure pertains to the precursor block copolymer in accordance with either one of the foregoing aspects twenty-five to twenty-eight, further comprising at least one interior block B, wherein each block B is essentially non-functionalized, is substantially resistant to halogenation, has a number average molecular weight of from about 1,000 to about 100,000, and has a glass transition temperature of at most about 20° C.

In a thirtieth aspect, the present disclosure pertains to the precursor block copolymer in accordance with either one of the foregoing aspects twenty-five to twenty-nine, wherein each block B is independently selected from the group consisting of polymerized (i) ethylene monomers, (ii) $C_3-C_8$ alpha-olefin monomers, (iii) isobutylene monomers, (iv) conjugated diene monomers, (v) (meth)acrylate ester monomers, (vi) a silicon polymer, and (vii) mixtures of monomers selected from (i) to (v), wherein segments containing polymerized conjugated diene monomers are hydrogenated.

In a thirty-first aspect, the present disclosure pertains to the precursor block copolymer in accordance with either one of the foregoing aspects twenty-five to thirty which has a general configuration A-D°-A, A-D°-A-D°-A, (A-D°-A)$_n$X, (A-D°)$_n$X, A-B-D°-B-A, A-D°-B-D°-A, (A-B-D°)$_n$X, (A-D°-B)$_n$X, or mixtures thereof, wherein n is an integer from 2 to about 30, and X is a coupling agent residue and wherein the plurality of A blocks, B blocks, or D° blocks are the same or different.

DETAILED DESCRIPTION OF THE INVENTION

Figure 1:
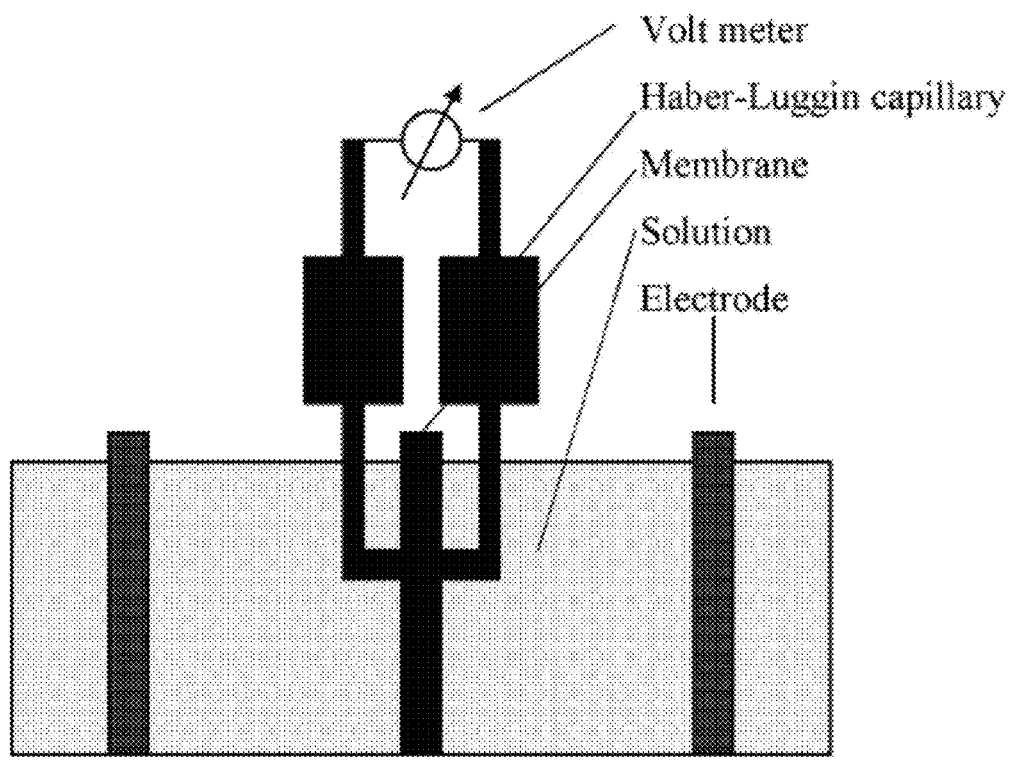
FIG. 1 is a schematic diagram of a set-up for measuring membrane resistance.

A detailed description of embodiments of the present invention is disclosed herein; however, it is to be understood that the disclosed embodiments are merely exemplary of the invention and that the invention may be embodied in various and alternative forms of the disclosed embodiments. Therefore, specific structural and functional details which are addressed in the embodiments disclosed herein are not to be interpreted as limiting, but merely as a basis for the claims and as a representative basis for teaching one skilled in the art to variously employ the present invention.

The present disclosure relates to block copolymers which are selectively functionalized in at least one interior block by amino- or phosphino-groups, or corresponding onium salt groups, and which exhibit anion exchange properties. More specifically, the selectively functionalized block copolymers comprise:
(a) at least two end blocks A, wherein each end block A is substantially free of amino- or phosphino-functional groups, has a number average molecular weight of from about 1,000 to about 60,000, and has a high service temperature; and
(b) at least one interior block D having a number average molecular weight of from about 1,000 to about 100,000 and comprising on average at least one amino- or phosphino-functionalized polymer unit of formula (I)

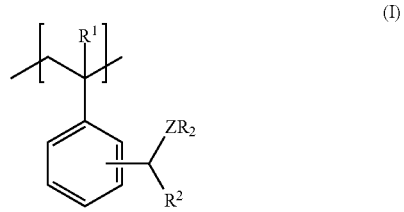

(I)

wherein
Z is nitrogen or phosphorous;
$R^1$ is hydrogen or alkyl;
$R^2$ is hydrogen or is tertiary alkyl;
R each independently, is hydrogen or is alkyl optionally substituted by a moiety $-(A^1-NR^a)_xR^b$; or
two R groups, together with the nitrogen to which they are bonded, form an optionally substituted ring;
x is 1, 2 or 3;
$A^1$ is straight chain alkylene optionally substituted by one or more methyl and/or ethyl groups; and
$R^a$ and $R^b$, each independently, is hydrogen or alkyl;
or a corresponding onium salt.

Unless specifically stated otherwise, all technical terms used herein have the meaning as commonly understood by those skilled in the art.

The designation of groups of the Periodic Table of the Elements is used herein in accordance with the current IUPAC convention.

When referring to a block copolymer herein, or to a polymer thereof, it is understood by those having ordinary skill in the art that properties such as the molecular weight or the specific amount(s) of the polymer units which are present are not absolute values but rather may vary from polymer strand to polymer strand, or from one polymer block A to the corresponding to polymer block A, within certain limits. Accordingly, properties such as the amount of a specific polymer unit in the block copolymer, or a particular block thereof, are referred to herein as the "average amount," or for molecular weight of the block copolymer or block, the "number average" is used unless otherwise designated. Additionally, for simplicity of discussion herein, the block copolymer itself may be referred to herein in the singular, but when referring to "average" it would be understood by those of skill in the art that in actual real world conditions, the block copolymer exists in a multitude of strands forming a polymer composition.

Unless specifically indicated otherwise, the expression "substantially free of amino- or phosphino-functional groups" as used herein with regard to polymer blocks A signifies that the respective polymer blocks comprise on average less than 1 polymer unit which carries a substituent comprising the moiety $-ZR_2$, or a corresponding onium salt. In particular, the respective polymer blocks comprise on average no measurable amounts of polymer units which carry a substituent comprising the moiety $-ZR_2$, or a corresponding onium salt.

Unless specifically indicated otherwise, the expression "functionalized" as used herein refers to block copolymers, and segments or blocks thereof, which comprise on average at least one polymer unit of formula (I) or a corresponding onium salt.

Unless specifically indicated otherwise, the expression "essentially non-functionalized" as used herein with regard to the polymer blocks B signifies that the respective polymer blocks comprise on average less than 1 polymer unit which carries a substituent comprising the moiety $-ZR_2$, or a corresponding onium salt. In particular, the respective polymer blocks comprise on average no measurable amounts of polymer units which carry a substituent comprising the moiety $-ZR_2$, or a corresponding onium salt.

Unless specifically indicated otherwise, the expression "onium salt" is used herein as a collective reference to ammonium and/or phosphonium salts of the functionalized block copolymer, a segment or block thereof, or a polymer unit thereof.

Unless specifically indicated otherwise, the expression "essentially non-halogenated" as used herein signifies that the respective polymer blocks comprise on average less than 1 polymer unit which carries a haloalkyl group. In particular, the respective polymer blocks comprise on average no measurable amounts of polymer units which carry a haloalkyl group.

The expression "polymer unit" as used herein refers to the unit of a polymer chain which is formed by, and corresponds to, one monomer.

Unless specifically indicated otherwise, the expression "halogen" as used herein refers to a halogen different from fluorine, in particular chlorine, bromine or iodine, more specifically chlorine or bromine.

Unless specifically indicated otherwise, the expression "substantially resistant to halogenation" as used herein with regard to the polymer blocks A of the precursor block copolymer means that little, if any, halogenation of the blocks occurs under the conditions employed when the polymer unit(s) of formula (III) of the interior block(s) D° is(are) halogenated to form the polymer unit(s) of formula (II) of the interior block(s) D*.

Unless specifically indicated otherwise, the expression "service temperature" as used herein refers to the range of temperatures at which the material has useful mechanical properties. The upper limit of the service temperature range denotes the temperature above which the mechanical performance of the material is insufficient to meet minimum performance attributes of a particular application. For example, at temperatures above the upper limit of the service temperature range, the material may suffer deformation under applied stress which can be detrimental to the performance. Depending on the nature of the polymer, the upper limit of the service temperature range may correspond to the glass-transition temperature, $T_g$, (glassy polymer blocks) or the melting temperature, $T_m$, (crystalline or semi-crystalline polymer blocks).

The expression "high service temperature" as used herein refers to an upper limit of the service temperature range of at least about 20° C.

Unless specifically stated otherwise, the expression "%-wt." as used herein refers to the number of parts by weight of monomer per 100 parts by weight of polymer on a dry weight basis, or the number of parts by weight of ingredient per 100 parts by weight of specified composition.

Unless specifically stated otherwise, the expression "molecular weight" as used herein and relating to a polymer or a block thereof refers to the number average molecular weight.

The expression "styrene-equivalent molecular weight" as used herein and relating to a block of a block copolymer refers to the molecular weight of the respective block as measured by gel permeation chromatography calibrated with a set of polystyrene standards.

The expression "equilibrium" as used herein in the context of water absorption refers to the state in which the rate of water absorption by a functionalized block copolymer is in balance with the rate of water loss by the functionalized block copolymer. The state of equilibrium can generally be reached by immersing the functionalized block copolymer in water for a 24 hour period (one day). The equilibrium state may be reached also in other wet environments, however, the period of time to reach equilibrium may differ.

The expression "hydrated" block copolymer as used herein refers to a functionalized block copolymer which has absorbed a significant amount of water.

The expression "wet state" as used herein refers to the state at which a functionalized block copolymer has reached equilibrium or has been immersed in water for a period of 24 hours.

The expression "dry state" as used herein refers to the state of a functionalized block copolymer which has absorbed essentially no or only insignificant amounts of water. For example, a functionalized block copolymer which is merely in contact with the atmosphere will generally remain in the dry state.

Unless specifically stated otherwise, the expression "solution" as used herein refers to a liquid, uniformly dispersed mixture at the molecular or ionic level of one or more substances (the solute) in one or more liquid substances (the solvent).

Unless specifically stated otherwise, the expression "dispersion" as used herein refers to a system having a continuous, liquid phase and at least one discontinuous phase. The discontinuous phase may be made up by solid, finely divided particles and/or by liquid droplets, including colloidal particles and micelles. The expression "dispersion" as used herein in particular includes systems in which at least one discontinuous phase is in form of micelles. Also, where the discontinuous phase(s) is(are) exclusively made up by liquid droplets, the expression "dispersion" in particular encompasses "emulsion." A person of ordinary skill will readily appreciate that there are no sharp differences between dispersions, colloidal or micellar solutions and solutions on a molecular level. Thus, a dispersion of micelles may also herein be referred to as a solution of micelles.

The expression "membrane" as used herein refers to a continuous, pliable sheet or layer of a material. For convenience and unless indicated otherwise, the expression "membrane" also may be used herein as a generic reference to membranes and membranous coverings, i.e., films and coatings.

The expression "film" as used herein refers to a membranous covering of a substrate wherein a membrane is reversibly attached to the substrate, i.e., the bonding between the membrane and the substrate allows separating the membrane from the substrate without causing significant harm to the integrity of the membrane.

The expression "coating" as used herein refers to a membranous covering of a substrate wherein a membrane is irreversibly attached to the substrate, i.e., under ordinary conditions the bonding between the membrane and the substrate does not allow separating the membrane from the substrate, or the separation causes significant harm to the integrity of the membrane.

Harm to the integrity of a membrane is considered insignificant so long as it does not prevent the membrane from performing a desired function. Those having ordinary skill will readily appreciate that there is no sharp boundary between the expressions "film" and "coating", and that any such boundary may be dependent upon the use or intended use, and the desired function, of the membranous covering.

The reference to a "corresponding sulfonated block copolymer" as used herein is meant as a reference to a selectively sulfonated block copolymer having similar blocks A and, where present, B in the same configuration as the functionalized block copolymer with which it is compared and which differs in that the interior blocks D of the functionalized block copolymer are replaced by sulfonated styrene blocks having similar molecular weight and ion exchange capacity (IEC) as the block D.

The expression "engineering thermoplastic resin" as used herein encompasses the various polymers such as for example thermoplastic polyester, thermoplastic polyurethane, poly(aryl ether) and poly(aryl sulfone), polycarbonate, acetal resin, polyamide, halogenated thermoplastic, nitrile barrier resin, poly(methyl methacrylate) and cyclic olefin copolymers, and further defined in U.S. Pat. No. 4,107,131.

All publications, patent applications, and patents mentioned herein are incorporated by reference in their entirety. In the event of conflict, the present specification, including definitions, is intended to control.

With respect to all ranges disclosed herein, such ranges are intended to include any combination of the mentioned upper and lower limits even if the particular combination is not specifically listed.

1. STRUCTURE OF THE FUNCTIONALIZED BLOCK COPOLYMER

The functionalized block copolymers of the present disclosure generally comprise as mandatory constituents at least two end blocks A and at least one interior block D. In particular embodiments, the functionalized block copolymer may further comprise one or more interior block(s) A and/or one or more interior block(s) B.

The end blocks A of the functionalized block copolymer, as well as any interior blocks A, are substantially free of functional groups. Additionally, each of the individual blocks A has a number average molecular weight of from about 1,000 to 60,000 and has a high service temperature.

The individual A blocks of the functionalized block copolymer may be identical or different. When the A blocks of the functionalized block copolymer differ such differences may reside in the number average molecular weight of the individual blocks. Additionally or alternatively, such differences may reside in the nature or in the composition of the monomers which make up the individual A blocks. Preferably, the individual A blocks are similar, although not necessarily identical, in the nature and in the composition of the monomers which make up each of the individual A blocks.

The nature and the composition of the monomers which make up the individual blocks A is not particular critical so long as the polymerized monomers provide for a polymer phase which meets the service temperature requirement and, thus, can be described as "glassy," "hard," "crystalline," or at least "semi-crystalline."

For glassy polymers, the upper limit of the service temperature range is typically limited by the temperature at which the polymer transitions from a glass-like behavior to a liquid-like behavior. This temperature is frequently referred to as glass-transition temperature, $T_g$. The $T_g$ of glassy end blocks A can be determined using differential scanning calorimetry (DSC) or dynamic mechanical analysis (DMA). For crystalline and semi-crystalline blocks A, the upper limit of the service temperature range is usually limited by the melting temperature, $T_m$, of the crystalline portion of the blocks. The melting temperature of crystalline or semicrystalline blocks A can be determined using DSC.

In general, the high service temperature of the end blocks A is at least about 20° C. In some embodiments, the high service temperature of the end blocks A is at least about 50° C. In further embodiments, the high service temperature of the end blocks A is at least about 90° C.

In particular embodiments, each of the blocks A is independently selected from the group consisting of polymerized (i) ethylene monomers; (ii) propylene monomers, (iii) styrene and alpha-alkyl styrene monomers having a phenyl ring which is optionally substituted by one or more alkyl groups, (iv) (meth)acrylate ester monomers, and (v) mixtures of monomers selected from (i) to (iv).

When the A block is a polymer block of ethylene, it may be useful to polymerize ethylene via a Ziegler-Natta process, as taught in the references in the review article by G. W. Coates et al., Angew. Chem., Int. Ed., 41, 2236-2257 (2002). It is preferred to manufacture such ethylene blocks using anionic polymerization techniques as taught in U.S. Pat. No. 3,450,795. The block molecular weight for such ethylene blocks typically is between about 1,000 and about 60,000.

When the A block is a polymer block of propylene, such polymer blocks may be prepared by a Ziegler-Natta process, as taught in the references in the review article by G. W. Coates et al., as cited above. The block molecular weight for such polypropylene blocks typically is between about 1,000 and about 60,000.

When the A block is a polymer block of hydrogenated polydienes, such as hydrogenated polybutadiene or hydrogenated polyisoprene, such polymer blocks may be prepared by methods known in the art and described, e.g., in U.S. Pat. No. 3,670,054 and U.S. Pat. No. 4,107,236. The block molecular weight of such hydrogenated polydiene blocks typically is between about 1,000 and about 60,000. The vinyl content of such A blocks, prior to hydrogenation, generally is at most 20%, more preferably at most 15%, and in particular at most 10%.

The A blocks also may be polymer blocks of styrene or alpha-alkyl styrene monomers having a phenyl ring which is optionally substituted by one or more alkyl group, such as optionally alkyl substituted styrene and alpha-methyl styrene, hereinafter collectively referred to as (methyl)styrene. The optional alkyl substituent of such (methyl)styrene monomers generally may have from 1 to 10 carbon atoms and may be straight chained or branched. Illustrative examples of such optionally alkyl substituted (methyl)styrene monomers include in particular unsubstituted (methyl) styrene monomers, ortho-alkyl substituted (methyl)styrene monomers, para-alkyl substituted (methyl)styrene monomers, and ortho,para-dialkyl substituted (methyl)styrene monomers. Preferred optionally alkyl substituted (methyl) styrene monomers include unsubstituted (methyl)styrene, ortho-methyl (methyl) styrene, ortho-ethyl (methyl)styrene, ortho-n-propyl (methyl) styrene, ortho-iso-propyl (methyl) styrene, ortho-n-butyl (methyl)styrene, ortho-iso-butyl (methyl)styrene, ortho-sec-butyl (methyl) styrene, ortho-tert-butyl (methyl)styrene, ortho-decyl (methyl)styrene, isomers of ortho-dodecyl (methyl)styrene, para-methyl (methyl) styrene, para-ethyl (methyl) styrene, para-n-propyl (methyl)styrene, para-iso-propyl (methyl)styrene, para-n-butyl (methyl) styrene, para-iso-butyl (methyl)styrene, para-sec-butyl (methyl)styrene, para-tert-butyl (methyl) styrene, para-decyl (methyl)styrene, isomers of para-dodecyl (methyl) styrene, ortho,para-dimethyl (methyl) styrene, ortho,para-diethyl (methyl)styrene, ortho,para-di(n-propyl) (methyl)styrene, ortho,para-di(iso-propyl) (methyl)styrene, ortho,para-di(n-butyl) (methyl)styrene, ortho,para-di(iso-butyl) (methyl) styrene, ortho,para-di(sec-butyl) (methyl) styrene, ortho,para-di(tert-butyl) (methyl) styrene, ortho, para-didecyl (methyl)styrene, isomers of ortho,para-didodecyl (methyl)styrene, and mixtures of the above monomers. Preferred (methyl)styrene monomers are the unsubstituted and the mentioned mono $C_1$-$C_4$-alkyl substituted (methyl)styrene monomers.

In particular embodiments, such A blocks are polymer blocks of styrene monomers in which the phenyl ring is optionally alkyl substituted. Illustrative examples of such optionally alkyl substituted styrene monomers include in particular unsubstituted styrene monomers, ortho-alkyl substituted styrene monomers, para-alkyl substituted styrene monomers, and ortho,para-dialkyl substituted styrene monomers. Preferred optionally alkyl substituted styrene monomers include unsubstituted styrene, ortho-methyl styrene, ortho-ethyl styrene, ortho-n-propyl styrene, ortho-iso-propyl styrene, ortho-n-butyl styrene, ortho-iso-butyl styrene, ortho-sec-butyl styrene, ortho-tert-butyl styrene, ortho-decyl styrene, isomers of ortho-dodecyl styrene, para-methyl styrene, para-ethyl styrene, para-n-propyl styrene, para-iso-propyl styrene, para-n-butyl styrene, para-iso-butyl styrene, para-sec-butyl styrene, para-tert-butyl styrene, para-decyl styrene, isomers of para-dodecyl styrene, ortho,para-dimethyl styrene, ortho,para-diethyl styrene, ortho,para-di(n-propyl) styrene, ortho,para-di(iso-propyl) styrene, ortho,para-di(n-butyl) styrene, ortho,para-di(iso-butyl) styrene, ortho,para-di(sec-butyl) styrene, ortho,para-di(tert-butyl) styrene, ortho,para-didecyl styrene, isomers of ortho,para-didodecyl styrene, and mixtures of the above monomers.

Preferred styrene monomers are the unsubstituted and the mentioned mono $C_1$-$C_4$-alkyl substituted styrene monomers.

When the A block is a polymer block of optionally substituted (alkyl)styrene, such polymer blocks also may be prepared by a Ziegler-Natta process, as taught in the references in the review article by G. W. Coates et al., as cited above. The block molecular weight for such (alkyl)styrene blocks typically is between about 1,000 and about 60,000. In the polymerization processes used to make such (alkyl)styrene blocks, only one of the monomers, for example, styrene may be used, or two or more thereof may be used in combination. When two or more of the (alkyl)styrene monomers are used in combination, they may be copolymerized in any copolymerization form, e.g., randomly, in form of blocks and tapered block and the like. The copolymerization form may be affected by selecting conditions such as a combination of the monomers and the timing of adding the monomers to the polymerization system (for example, simultaneous addition of two or more monomers, or separate additions at intervals of a given time).

The A blocks may also be polymer blocks of acrylic esters or methacrylic esters, hereinafter collectively referred to as (meth)acrylic esters. Such polymer blocks may be made according to the methods disclosed in U.S. Pat. No. 6,767,976. Specific examples of suitable (meth)acrylic ester include esters of a primary alcohol and (meth)acrylic acid, such as methyl (meth)acrylate, ethyl (meth)acrylate, propyl (meth)acrylate, n-butyl (meth)acrylate, isobutyl (meth)acrylate, hexyl (meth)acrylate, 2-ethylhexyl (meth)acrylate, dodecyl (meth)acrylate, lauryl (meth)acrylate, methoxyethyl (meth)acrylate; esters of a secondary alcohol and (meth)acrylic acid, such as isopropyl (meth)acrylate, cyclohexyl (meth)acrylate and isobornyl (meth)acrylate; and esters of a tertiary alcohol and (meth)acrylic acid, such as tert-butyl (meth)acrylate. If necessary, as raw material or raw materials, one or more of other anionic polymerizable monomers may be used together with the (meth)acrylic ester in the present invention. Moreover, there may be used a multifunctional anionic polymerizable monomer having in the molecule thereof two or more methacrylic or acrylic structures, such as (meth)acrylic ester structures, for example, ethylene glycol di(meth)acrylate, 1,4-butanediol di(meth)acrylate, 1,6-hexanediol di(meth)acrylate, and trimethylolpropane tri(meth)acrylate.

In the polymerization processes used to make the (meth)acrylic ester polymer blocks, only one of the monomers, for example, the (meth)acrylic ester may be used, or two or more thereof may be used in combination. When two or more of the monomers are used in combination, any copolymerization form selected from random, block, tapered block and the like is suitable. The copolymerization forms may be affected by selecting conditions such as a combination of the monomers and the timing of adding the monomers to the polymerization system (for example, simultaneous addition of two or more monomers, or separate additions at intervals of a given time).

In some of the particular embodiments, each of the blocks A is a homo- or copolymer of (methyl)styrene and/or optionally $C_1$-$C_4$-alkyl substituted (methyl)styrene. In further particular embodiments, each of the blocks A is a homo- or copolymer of styrene and/or optionally $C_1$-$C_4$-alkyl substituted styrene.

The optional interior blocks B of the functionalized block copolymer also are substantially free of functional groups. Additionally, each of such blocks B may have a number average molecular weight of from about 1,000 to 100,000 and may have a glass transition temperature, $T_g$, of at most 20° C. In some embodiments, the optional interior blocks B of the functionalized block copolymer has a glass transition temperature, $T_g$, of at most 10° C. In further embodiments, the optional interior blocks B of the functionalized block copolymer has a glass transition temperature, $T_g$, of at most 0° C.

When multiple blocks B are present in the functionalized block copolymer such blocks may be identical or different. Differences between the individual blocks B may reside in the number average molecular weight or in the nature or the composition of the monomers which make up the individual blocks B. Where multiple blocks B are present, the individual B blocks preferably are similar, although not necessarily identical, in the nature and in the composition of the monomers which make up each of the individual B blocks.

The nature and composition of the monomers which make up the individual blocks B is not particularly critical so long as the polymerized monomers provide a phase which meets the glass temperature requirement and, thus, can be described as "amorphous," "soft" or "rubbery."

In particular embodiments, each block B is independently selected from the group consisting of polymerized (i) ethylene monomers, (ii) $C_3$-$C_8$ alpha-olefin monomers, (iii) isobutylene monomers, (iv) conjugated diene monomers, (v) (meth)acrylate ester monomers, (vi) a silicon polymer, and (vii) mixtures of monomers selected from (i) to (v), wherein segments containing polymerized conjugated diene monomers are optionally hydrogenated.

When the B blocks are polymer blocks of ethylene, it may be useful to polymerize ethylene via a Ziegler-Natta process, as taught in the references in the review article by G. W. Coates et al., as cited above. It is preferred to make the ethylene blocks using anionic polymerization techniques as taught in U.S. Pat. No. 3,450,795. The block molecular weight for such ethylene blocks typically is between about 1,000 and about 100,000.

When the B blocks are polymers of $C_3$-$C_8$ alpha-olefins or isobutylene, such polymer blocks also may be prepared by a Ziegler-Natta process, as taught in the references in the review article by G. W. Coates et al., as cited above. Preferably, the alpha-olefins are propylene, butylene, hexene or octene, with propylene being most preferred. The block molecular weight for such alpha-olefin blocks typically is between about 1,000 and about 100,000.

The B blocks may also be polymer blocks of conjugated dienes which are optionally hydrogenated. Suitable conjugated dienes include, e.g., butadiene, isoprene, and the like, as well as 1,3-cyclodiene monomers, such as 1,3-cyclohexadiene, 1,3-cycloheptadiene and 1,3-cyclooctadiene, preferably 1,3-cyclohexadiene. In the event that the amino- or phosphino-functional group is introduced after copolymerization of the various blocks as more specifically addressed herein below it will be necessary to hydrogenate the B blocks when using conjugated diene monomers because non-hydrogenated polymerized conjugated diene blocks are susceptible to halogenation. Accordingly, non-halogenated precursor block copolymers which comprise one or more B block(s) made using conjugated diene monomers will be hydrogenated prior to functionalization. When the B blocks are optionally hydrogenated polymer blocks of conjugated acyclic dienes such as butadiene, isoprene or mixtures thereof, such blocks should have a vinyl content of from 20 and 80 mol percent prior to hydrogenation.

The B blocks may also be polymer blocks of (meth)acrylic esters. Such polymer blocks may be made according to the methods disclosed in U.S. Pat. No. 6,767,976. Specific examples of suitable (meth)acrylic ester include esters of a primary alcohol and (meth)acrylic acid, such as propyl (meth)acrylate, n-butyl (meth)acrylate, isobutyl (meth)acrylate, hexyl (meth)acrylate, 2-ethylhexyl (meth)acrylate, dodecyl (meth)acrylate, lauryl (meth)acrylate, methoxyethyl (meth)acrylate; esters of a secondary alcohol and (meth) acrylic acid, such as isopropyl (meth)acrylate, cyclohexyl (meth)acrylate and isobornyl (meth)acrylate; and esters of a tertiary alcohol and (meth)acrylic acid, such as tert-butyl (meth)acrylate. If necessary, as raw material or raw materials, one or more of other anionic polymerizable monomers may be used together with the (meth)acrylic ester in the present invention. Moreover, there may be used a multifunctional anionic polymerizable monomer having in the molecule thereof two or more methacrylic or acrylic structures, such as (meth)acrylic ester structures, for example, ethylene glycol di(meth)acrylate, 1,4-butanediol di(meth) acrylate, 1,6-hexanediol di(meth)acrylate, and trimethylolpropane tri(meth)acrylate.

Additionally, the B blocks may be polymer blocks of silicon rubber segments, i.e., blocks of organopolysiloxanes having recurring units of —[Si(R')$_2$—O]— wherein R' denotes an organic radical, e.g., alkyl, cycloalkyl or aryl.

The B blocks may also contain up to 15 mol percent of the styrene monomers mentioned for the A blocks. In some embodiments, the B blocks may contain up to 10 mol percent, preferably they will contain only up to 5 mol percent, and particularly preferably only up to 2 mol percent of the styrene monomers mentioned in the A blocks. However, in the most preferred embodiments, the B blocks will contain no styrene monomers.

In some of the particular embodiments, each of the blocks B is an optionally hydrogenated homopolymer of butadiene or isoprene.

The functionalized block copolymer of the present disclosure is distinguished due to the presence of at least one interior block D which has a number average molecular weight of from about 1,000 to about 100,000 and which comprises, on average, at least one amino- or phosphino-functionalized polymer unit of formula (I)

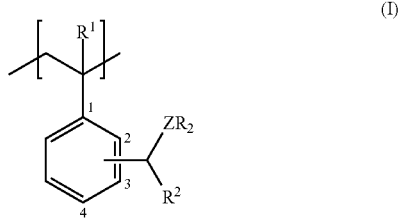

(I)

or a corresponding onium salt.

The position in which the moiety —CHR$^2$—ZR$_2$, or a corresponding onium salt moiety, is bonded to the phenyl ring in formula (I) is generally not critical. Accordingly, the moiety can be linked to the 2-position (ortho), 3-position (meta), or 4-position (para). With a view to ease of access to, and synthesis of, precursor block copolymers or monomers, the moiety preferably is linked to the 2- or 4-position, more preferably the 4-position.

In the above formula (I), Z represents nitrogen or phosphorous with nitrogen being preferred.

R$^1$ in formula (I) represents hydrogen or an alkyl group. Alkyl groups in the position of R$^1$ may have from 1 to 6 carbon atoms and may be straight chained or branched. Illustrative alkyl groups for R$^1$ include methyl, ethyl, n-propyl, iso-propyl, n-butyl, iso-butyl, sec-butyl, tert-butyl and the like. In particular embodiments, R$^1$ represents hydrogen or methyl.

R$^2$ in formula (I) represents hydrogen or a tertiary alkyl group. Tertiary alkyl groups in the position of R$^2$ may have from 4 to 10 carbon atoms and, aside from the branching in the 1-position, may be straight chained or branched. Illustrative tertiary alkyl groups for R$^2$ include tert-butyl, 1,1-dimethyl-propyl, 1,1-dimethyl-butyl, 1,1,2-trimethyl-propyl, 1-ethyl, 1-methyl-propyl, and the like. In particular embodiments, R$^2$ represents hydrogen, or tert-butyl.

In some of the embodiments, the groups represented by R in the moiety —ZR$_2$ in formula (I) may be identical or different and each R independently represents hydrogen or an alkyl group which in turn is optionally substituted by a moiety -(A$^1$-NR$^a$)$_x$R$^b$. Accordingly, one or both R may be hydrogen, or one R may be hydrogen whereas the other R is an optionally substituted alkyl group. Alternatively one or both R groups may be identical or different unsubstituted alkyl groups, or one R is an unsubstituted alkyl group whereas the other R is a substituted alkyl group. In alternative embodiments, both R represent identical or different substituted alkyl groups. In some of the particular embodiments, at least one of the R groups is different from hydrogen. In further particular embodiments, both of the groups R are different from hydrogen.

Unsubstituted alkyl groups in the position of R may have from 1 to 10 carbon atoms and may be straight chained or branched. Illustrative unsubstituted alkyl groups for R include methyl, ethyl, n-propyl, iso-propyl, n-butyl, iso-butyl, sec-butyl, tert-butyl, and the isomers of pentyl, hexyl, heptyl, octyl, nonyl and decyl. In some of the particular embodiments at least one R of the moiety —ZR$_2$ in formula (I) is an unsubstituted C$_1$-C$_6$-alkyl group. In further particular embodiments each R of the moiety —ZR$_2$ in formula (I), independently, is an unsubstituted C$_1$-C$_6$-alkyl group.

When R in the moiety —ZR$_2$ in formula (I) represents and alkyl group which is substituted by a moiety -(A$^1$-NR$^a$)$_x$R$^b$, such R generally is straight chained, has from 2 to 4 carbon atoms, and optionally carries one or more additional methyl and/or ethyl groups. Illustrative substituted alkyl groups, thus, include moieties such as substituted 1,2-ethylene, 1,2-propylene, 1,3-propylene, 1,2-butylene, 1,3-butylene, 2,3-butylene, 1,4-butylene, 2,3-pentylene, 2,4-pentylene, 2,4-pentylene, 3-methyl-2,4-pentylene, and the like. In some of the particular embodiments, such optionally substituted alkyl group represented by R is 1,2-ethylene, 1,2-propylene, 1,3-propylene, or 1,4-butylene.

The variable x of the substituent -(A$^1$-NR$^a$)$_x$R$^b$ represents an integer 1, 2 or 3, preferably 1 or 2.

A$^1$ of the substituent -(A$^1$-NR$^a$)$_x$R$^b$ represents a straight chained alkylene group which is optionally substituted by one or more methyl and/or ethyl groups. The straight chained alkylene groups represented by A$^1$ generally have from 2 to 4 carbon atoms. Illustrative optionally methyl- and/or ethyl-substituted alkylene groups as represented by A$^1$, thus, include moieties such as substituted 1,2-ethylene, 1,2-propylene, 1,3-propylene, 1,2-butylene, 1,3-butylene, 2,3-butylene, 1,4-butylene, 2,3-pentylene, 2,4-pentylene, 2,4-pentylene, 3-methyl-2,4-pentylene, and the like. In some of the particular embodiments, the optionally methyl- and/or ethyl-substituted alkylene group represented by A$^1$ is 1,2-ethylene, 1,2-propylene, 1,3-propylene, or 1,4-butylene.

The groups represented by R$^a$ and R$^b$ of the substituent -(A$^1$-NR$^a$)$_x$R$^b$ may be identical or different and each of R$^a$ and R$^b$, independently, represents hydrogen or an alkyl group. That is, if x has a value of 2 or 3, the groups represented by $R^a$ may be identical or different and each $R^a$, independently, represents hydrogen or an alkyl group. Alkyl groups in the position of $R^a$ and $R^b$ may have from 1 to 6 carbon atoms and may be straight chained or branched. Illustrative alkyl groups for $R^a$ and $R^b$ include methyl, ethyl, n-propyl, iso-propyl, n-butyl, iso-butyl, sec-butyl, tert-butyl and the like. In some of the particular embodiments, $R^a$ and $R^b$ represent hydrogen or $C_1$-$C_6$-alkyl. In further particular embodiments, each of $R^a$ and $R^b$, independently, represents $C_1$-$C_6$-alkyl.

In further embodiments the two R of the moiety —$ZR_2$ in formula (I), together with the Z to which they are bonded, form an optionally substituted ring which is made up of Z, carbon ring members, and optionally one or more additional hetero atom ring members selected from the groups of nitrogen and oxygen. The rings formed by Z and two R may have from 3 to 14 ring members, may be mono- or polycyclic, and may be saturated, partly unsaturated or aromatic. Optionally, such rings are substituted by one or more alkyl groups as hereinbefore mentioned in general and in particular for $R^a$. Illustrative examples of the rings formed by Z and two R include moieties such as pyrrolidine, piperidine, piperazine, 1-azabicyclo[2,2,2]nonane, 1,4-diazabicyclo[2,2,2]octane (DABCO), morpholine, pyrrole, pyrazole, imidazole, pyridine, pyridazine, pyrimidine, pyrazine, indole, isoindole, indazole, purine, carbazole, phenoxazine, azepine, the corresponding phosphorous containing rings, and the like. Those having ordinary skill will appreciate that the nitrogen in systems such as, e.g., DABCO and the like as mentioned in the foregoing, carries three substituents. More specifically, when —$ZR_2$ represents DABCO, the phenyl ring in formula (I) carries a group

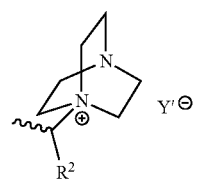

wherein ⌇ denotes the linkage to the phenyl ring and $Y'$ represents an anion equivalent. The respective polymer units of this type fall within the realm of the mentioned corresponding onium salts.

Accordingly, in some of the embodiments, the corresponding onium salt of the functionalized polymer unit, more generally, can be represented by formula ($I^i$)

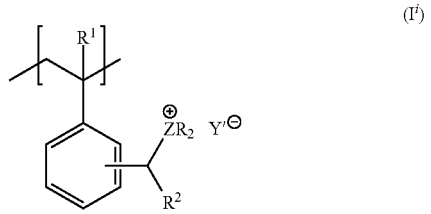

wherein $R^1$, $R^2$, R and $Y'^-$ have the aforementioned meaning. In other embodiments, where the group(s) R represent alkyl which is substituted by a moiety -($A^1$-$NR^a$)$_x R^b$, one or more of the nitrogens of the -($A^1$-$NR^a$)$_x R^b$ substituent(s) may by quaternized to form a corresponding onium salt of the functionalized polymer unit. Similarly, when the groups R, together with the Z atom to which they are bonded, form a heterocyclic ring system containing nitrogen ring members in addition to Z, such additional nitrogen ring members may be quaternized. For example, when —$ZR_2$ represents an optionally substituted piperazine ring, the corresponding onium salt may have a structure as represented by either one of formulae ($I^{ii}$) to ($I^{iv}$):

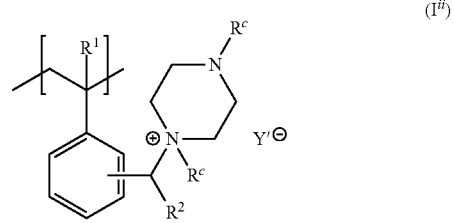

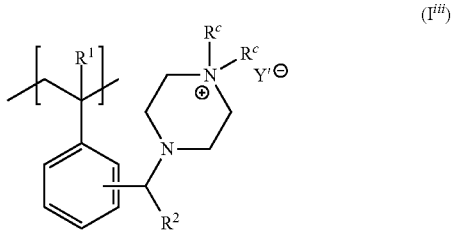

($I^{iv}$)

wherein $Y'^-$ has the aforementioned meaning and each $R^c$ independently is hydrogen or alkyl as in general and in particular mentioned for $R^a$. Similarly, when the groups R, together with the Z atom to which they are bonded, form the DABCO ring system, the substituent of the phenyl ring in formula (I) of the corresponding onium salts, also, may have one of the following structures:

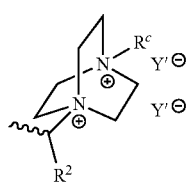

Accordingly, the corresponding onium salts of the functionalized polymer units may be represented generically by formula (I.1)

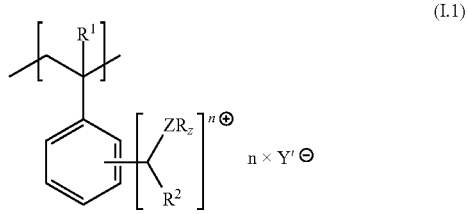

(I.1)

wherein the index z is 2 or 3, n is the total number of quaternized nitrogen and phosphorous atoms which are present in the —ZR$_2$ or —ZR$_3^+$ sub-structure, and Y'$^-$ has the aforementioned meaning.

It is apparent from the foregoing that the number of functional groups which are present in the block D is determined by the average amount of functionalized polymer units, corresponding to formula (I), multiplied by the total number of nitrogen and phosphorous atoms present in the —ZR$_2$ or —ZR$_3^+$ sub-structure. When the functionalized block copolymer is in form of an onium salt it is generally preferred that at least 5%, or at least 10% or at least 15%, and up to 100%, of the functional groups are in form of the onium salt.

The anion which provides the anion equivalent Y'$^-$ of the onium salt is not specifically restricted. In general, the anion may be any mono-basic or poly-basic anion of an inorganic acid or organic acid. Illustrative examples of anions include, for example, halogenides, in particular chloride, bromide and iodide, hydroxyl (OH$^-$), sulfate (SO$_4^{2-}$), hydrogensulfate (H$_2$O$_4^-$), nitrate (NO$_3^-$), phosphate (PO$_4^{3-}$), hydrogen phosphate (HPO$_4^{2-}$), dihydrogen phosphate (H$_2$PO$_4^-$), carbonate (CO$_3^{2-}$), bicarbonate (HCO$_3^-$), borate (H$_4$BO$_4^-$), and the like; organic sulfonates such as mesylate (CH$_3$—SO$_3^-$), triflate (CF$_3$—SO$_3^-$), tosylate (4-CH$_3$—C$_6$H$_4$—SO$_3^-$), besylate (C$_6$H$_5$—SO$_3^-$), and the like; organic carboxylates such as acetate (CH$_3$—CO$_2^-$), chloroacetate (CH$_2$Cl—CO$_2^-$), dichloroacetate (CHCl$_2$—CO$_2^-$), trifluoroacetate (CF$_3$—CO$_2^-$), oxalate ((CO$_2$)$_2^{2-}$), propionate (C$_2$H$_5$—CO$_2^-$), malonate ((CH$_2$CO$_2$)$_2^{2-}$), butyrate (C$_3$H$_7$—CO$_2^-$), succinate ([CH$_2$(CH$_2$CO$_2$)$_2$]$^{2-}$), benzoate (C$_6$H$_5$—CO$_2^-$), phthalates (C$_6$H$_4$(CO$_2$)$_2^{2-}$), bis(trimethylsilyl)imide ([(CH$_3$)$_3$Si]$_2$N$^-$), bis(trifluoromethylsulfonyl)imide ([CF$_3$SO$_2$]$_2$N$^-$), and the like.

The functionalized block copolymer units of formula (I), and the corresponding onium salts, which distinguish the D block are derived from (alkyl)styrene or (alkyl)styrene wherein the phenyl ring is substituted by a primary alkyl group, i.e., —CH$_2$—R$^2$. Accordingly, each D block, independently, is selected from the group of (i) segments derived from homo- and copolymers of styrene, (ii) segments derived from homo- and copolymers of styrene having a phenyl ring which is substituted by a primary alkyl group, (iii) segments derived from homo- and copolymer of alpha-alkyl styrene, and (iv) segments derived from homo- and copolymers of alpha-alkyl styrene having a phenyl ring which is substituted by a primary alkyl group.

In particular embodiments, the D blocks are derived from styrene or styrene wherein the phenyl ring is substituted by a primary alkyl group —CH$_2$—R$^2$. In such embodiments, each D block, independently, is selected from the group of (i) segments derived from homo- and copolymers of styrene, and (ii) segments derived from homo- and copolymers of styrene having a phenyl ring which is substituted by the primary alkyl group.

In general, the functionalized interior block D comprises on average at least one functionalized polymer unit of formula (I) or a corresponding onium salt. However, as the amount of functional groups which are present in the functionalized block copolymer has a direct impact on the anion exchange capacity of the material, it is frequently preferred that at least 5% of the (alkyl)styrene derived polymer units of the D block are polymer units of formula (I) or the corresponding onium salt. In some of these preferred embodiments, at least 10%, or at least 15%, or at least 20%, or at least 25%, or at least 30% of the (alkyl)styrene derived polymer units of the D block are polymer units of formula (I) or the corresponding onium salt.

In some embodiments, 100% of the (alkyl)styrene derived polymer units of the D block are polymer units of formula (I) or the corresponding onium salt. In other embodiments, on average up to 98%, or up to 95%, or up to 90%, or up to 85%, of the (alkyl)styrene derived polymer units of the D block are polymer units of formula (I) or the corresponding onium salt.

Accordingly, in some of the embodiments, on average from 10% to 100%, or from 15% to 100%, or from 20% to 100%, or from 25% to 100%, or from 30% to 100%, of the (alkyl)styrene derived polymer units of the D block are polymer units of formula (I) or the corresponding onium salt. In further embodiments, on average from 10% to 98%, or from 15% to 98%, or from 20% to 98%, or from 25% to 98%, or from 30% to 98%, of the (alkyl)styrene derived polymer units of the D block are polymer units of formula (I) or the corresponding onium salt. In some of the embodiments, on average from 10% to 95%, or from 15% to 95%, or from 20% to 95%, or from 25% to 95%, or from 30% to 95%, of the (alkyl)styrene derived polymer units of the D block are polymer units of formula (I) or the corresponding onium salt. In other embodiments, on average from 10% to 90%, or from 15% to 90%, or from 20% to 90%, or from 25% to 90%, or from 30% to 90%, of the (alkyl)styrene derived polymer units of the D block are polymer units of formula (I) or the corresponding onium salt. In yet further embodiments, on average from 10% to 85%, or from 15% to 85%, or from 20% to 85%, or from 25% to 85%, or from 30% to 85%, of the (alkyl)styrene derived polymer units of the D block are polymer units of formula (I) or the corresponding onium salt.

When multiple blocks D are present in the functionalized block copolymer, the individual blocks D may be identical or different. Differences between multiple blocks D may reside in one or more of (i) the number average molecular weight, (ii) the number of functionalized block copolymer units of formula (I) and the corresponding onium salts, (iii) the presence or absence of co-polymerized monomers, and (iv) where present, the amount and the nature of such co-polymerized monomers.

The co-monomers which may be copolymerized with the aforementioned (alkyl)styrene units of the block(s) D are not particularly restricted. Essentially all of the monomers mentioned in the context of the blocks A and B are suitable. When two or more of the monomers are used in combination, any copolymerization form selected from random, block, tapered block, controlled distribution block, and the like copolymerization forms may be utilized. For example, the D blocks may be derived from (alkyl)styrene-co-[conjugated diene] blocks having a controlled distribution of the co-monomers, and partially, selectively, or fully hydrogenated counterparts thereof, such as disclosed in U.S. Pat. No. 7,169,848.

When the D blocks are derived from copolymers of the aforementioned (alkyl)styrenes, the (alkyl)styrene polymer units should constitute on average at least about 10% of the co-polymerized polymer block units. More preferably, the (alkyl)styrene polymer units of such co-polymerized block(s) D constitute on average at least about 15%, or at least about 20%, or at least about 25%, or at least about 30%, of the co-polymerized polymer block units. Moreover, the aforementioned (alkyl)styrenes of such co-polymerized block(s) D constitute on average at most about 80%, or at most about 75%, or at most about 70%, of the co-polymerized polymer block units.

Accordingly, in some of the embodiments in which a block D is derived from copolymers of the aforementioned (alkyl)styrenes the (alkyl)styrene polymer units should constitute on average from about 10% to about 80%, or from about 15% to about 80%, or from about 20% to about 80%, or from about 25% to about 80%, or from about 30% to about 80%, of the co-polymerized polymer block units. In further embodiments in which a block D is derived from copolymers of the aforementioned (alkyl)styrenes the (alkyl)styrene polymer units should constitute on average from about 10% to about 75%, or from about 15% to about 75%, or from about 20% to about 75%, or from about 25% to about 75%, or from about 30% to about 75%, of the co-polymerized polymer block units. In other embodiments in which a block D is derived from copolymers of the aforementioned (alkyl)styrenes the (alkyl)styrene polymer units should constitute on average from about 10% to about 70%, or from about 15% to about 70%, or from about 20% to about 70%, or from about 25% to about 70%, or from about 30% to about 70%, of the co-polymerized polymer block units.

In particular embodiments, each block D consists of polymer units of formula (I), or the corresponding onium salt, and optionally polymer units derived from one or more monomers selected from the group consisting of styrene and alpha-alkyl styrene in each case having a phenyl ring which is optionally substituted by a primary alkyl group.

The A, D and optional B blocks of the functionalized block copolymers may be arranged in various configurations so long as the end blocks of such configurations are A blocks, i.e., the D block(s) and optional B block(s) are interior blocks. In some embodiments, the functionalized block copolymers comprise, in addition to the mandatory A and D blocks, at least one further block B. In particular embodiments, the functionalized block copolymers have a general configuration A-D-A, A-D-A-D-A, (A-D-A)$_n$X, (A-D)$_n$X, A-B-D-B-A, A-D-B-D-A, (A-B-D)$_n$ X, (A-D-B)$_n$ X, or mixtures thereof, wherein n is an integer from 2 to about 30, and X is a coupling agent residue, and wherein the plurality of A blocks, B blocks, or D blocks are the same or different. In further particular embodiments, the functionalized block copolymers have a general configuration A-B-D-B-A, A-D-B-D-A, (A-B-D)$_n$X, (A-D-B)$_n$X, or mixtures thereof, wherein n is an integer from 2 to about 30, and X is a coupling agent residue, and wherein the plurality of A blocks, B blocks, or D blocks are the same or different.

2. MANUFACTURE OF THE FUNCTIONALIZED BLOCK COPOLYMER

The functionalized block copolymers can be prepared in various ways as schematically illustrated in the following scheme:

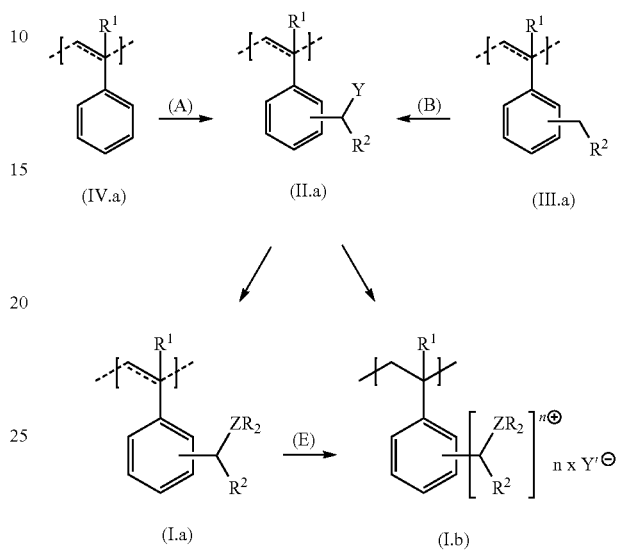

$R^1$, $R^2$, Z, R, $Y'^-$, z, and n, in the foregoing formulae (II.a), (III.a), (IV.a), (I.a), and (I.b), have the meaning addressed in general and in particular in the foregoing. Y in formula (II.a) represents halogen, in particular chlorine or bromine. The sub-structure

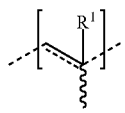

in formulae (II.a), (III.a), (IV.a), and (I.a), is intended to indicate that the starting material and product of the respective conversion may be a monomer or may be a polymer unit of a precursor block copolymer (formulae (III.a) and (IV.a)), of a halogenated block copolymer (formula (II.a)), or of a functionalized block copolymer (formulae (I.a)), respectively. Conveniently, the block copolymerization is conducted prior to either one of the conversions (A), (B), or (E). Those having ordinary skill will appreciate that the direct conversion from formula (II.a) to formula (I.b) along path (C) requires that formula (II.a) represent the unit of a halogenated block copolymer. Contrastingly, the indirect conversion from formula (II.a) to formula (I.b) via formula (I.a) along path (D) and (E) may be conducted such that the starting material represented by formula (II.a) and the product represented by formula (I.a) are monomeric, the monomer (I.a) is subsequently block copolymerized to yield a functionalized block copolymer, also represented by formula (I.a), and the functionalized block copolymer represented by formula (I.a) is subsequently quaternized to yield the functionalized block copolymer represented by formula (I.b). The respective approach is schematically illustrated in the following scheme.

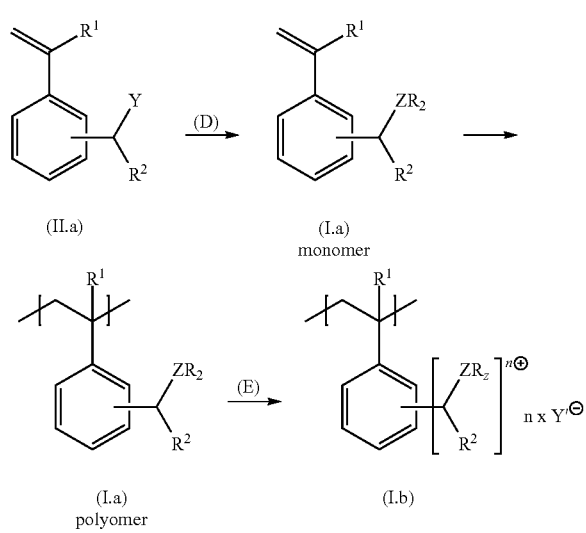

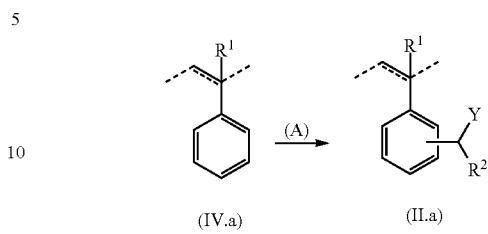

haloalkylation are found, e.g., in U.S. Pat. No. 5,814,627, in Blanc et al., Bull. Soc. Chim. France 33, 313 et seq. (1923), and in Vinodh et al., J. Biosci. Tech. 1(1), 45-51 (2009).

The indirect conversion from formula (II.a) to formula (I.b) via formula (I.a) along path (D) and (E) in which the starting material represented by formula (II.a) and the product represented by formula (I.a) are monomeric, and the monomer (I.a) is subsequently block copolymerized to yield the functionalized block copolymer, also represented by formula (I.a), is a particularly preferred route for producing functionalized block copolymers which comprise one or more blocks B or D having non-hydrogenated segments or polymer units of polymerized conjugated dienes.

On the other hand, when producing functionalized block copolymers which comprise one or more blocks B or D having hydrogenated segments or polymer units of polymerized conjugated dienes it is generally preferable to conduct the block copolymerization and the hydrogenation of the non-hydrogenated segments or polymer units of polymerized conjugated dienes prior to the conversions along path (A) or (B).

Also, when preparing a membrane comprising the onium salt functionalized block copolymer represented by formula (I.b), it may be convenient to cast the halogenated block copolymer represented by formula (II.a), or the functionalized block copolymer represented by formula (I.a), into a membrane before effecting the conversions along paths (C) and (E). In alternative embodiments, a solution or dispersion of the onium salt functionalized block copolymer represented by formula (I.b) can be cast to obtain the requisite membrane.

The block copolymerization of the respective monomers, the hydrogenation of segments comprising polymerized conjugated dienes, as well as the conversions along paths (A) through (E) can be conducted in a manner generally known to those skilled in the art or corresponding to those known methods as described hereinafter. For convenience, the monomers which are represented in the foregoing scheme by formulae (II.a), (III.a), (IV.a), and (I.a), as well as the polymer units which are represented in the foregoing scheme by formulae (II.a), (III.a), (IV.a), (I.a), and (I.b), in the following may be collectively referred to as units of the respective formula.

(A) Haloalkylation

The conversion of units of formula (IV.a) to obtain units of formula (II.a) is known in the art as haloalkylation and can be conducted under conditions corresponding to the known procedures. Illustrative descriptions of conditions for haloalkylation are found, e.g., in U.S. Pat. No. 5,814,627, in Blanc et al., Bull. Soc. Chim. France 33, 313 et seq. (1923), and in Vinodh et al., J. Biosci. Tech. 1(1), 45-51 (2009).

The haloalkylation is generally carried out by reacting the unit of formula (IV.a) with a haloalkylating agent in the presence of a Friedel-Crafts catalyst. The reaction can be conducted in an inert aprotic solvent, or the haloalkylating agent may be used as the solvent. Suitable haloalkylating agents include chloromethyl methyl ether, methylene chloride, bis(chloromethyl) ether. Suitable Friedel-Crafts catalysts include Lewis acid catalysts such as zinc chloride, iron(III) chloride, tin(IV) chloride, aluminum chloride, and the like.

Alternatively, the reaction can be carried out using a combination of a hydro halogenic acid such as HCl, HBr or HI, and an aldehyde $R^2$—CHO, as the haloalkylating agent.

The reaction normally takes place in solution or dispersion of the unit of formula (IV.a). However, when the unit of formula (IV.a) is the polymer unit of a precursor block copolymer, it is also possible to react the precursor block copolymer in the swollen state. Under those circumstances it is preferable that the precursor polymer be swollen in the haloalkylating agent.

The reaction temperature may vary depending on the type of the catalyst and haloalkylating agent, and is normally controlled within the range of room temperature (~25° C.) and about 100° C. as cross-linking may occur as a side reaction at elevated temperatures. When a combination of chloromethyl methyl ether, hydrochloric acid, and zinc chloride is used, the reaction temperature is usually controlled in the range of from about 35 to about 70° C.

In a particular embodiment, the haloalkylation is conveniently used to prepare halogenated block copolymer intermediates having at least one interior block D* which comprises polymer units of formula (II.a) wherein —$CHR^2$—Y is a 4-chloromethyl group. In this approach, the haloalkylating agent preferably is a combination of chloromethyl methyl ether and hydrochloric acid, and the Lewis acid catalyst is zinc chloride.

Those having ordinary skill will appreciate that the vinyl group of a monomer corresponding to formula (IV.a) may give rise to undesired side reactions and by-products or the haloalkylation. Accordingly, it is generally preferred to employ this reaction to convert a suitable precursor block polymer (IV.a) to the corresponding selectively halogenated block copolymer.

(B) Halogenation

In an alternative to the haloalkylation of a unit of formula (IV.a) along path (A), halogenated units of formula (II.a) can also be produced by halogenating a unit of formula (III.a) along path (B) under conditions conventionally employed to halogenate an allylic methylene group. Illustrative descriptions of such halogenation reactions are found, e.g., in US 2006/0217569, and in Dauben et al., J. Am. Chem. Soc. 81(18), 4863-4873 (1959).

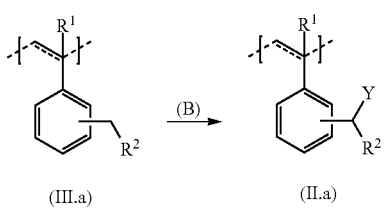

(III.a)  (II.a)

In this approach, the unit of formula (II.a) is prepared by reacting the unit of formula (III.a) with a halogenating agent in an inert solvent or diluent in the presence of an initiator. The halogenating agent most commonly employed is N-bromo-succinimide (NBS) although other halogenating agents such as N-chloro-succinimide, N-bromo-tert-butylamine, N-bromo-hydantoins, e.g., N,N-dibromohydantoin, dibromodimethylhydantoin (DBDMH) and the like, may also be used. The reaction involves free radicals and may be initiated using UV light and/or free-radical initiators which are commonly used for that purpose, e.g., tert-butyl hypochlorite, peroxides such as benzoyl peroxide or azo compounds such as azo-bis-isobutyronitrile (AIBN), and the like. Conveniently, a combination of NBS and AIBN can be employed to prepare units of formula (II.a) in which Y denotes bromine. Any aprotic solvent or diluent may be used with the exception of ethers which may form peroxides and, thus, may give rise to hazardous conditions. Accordingly, aprotic solvents are non-halogenated hydrocarbon solvents, and can include for example pentane, hexane, heptane, cyclohexane, etc. However, in other examples, the solvent used can include halogenated hydrocarbon solvents, including methylene chloride, chloroform, chlorobenzene and/or tetrachloromethane. In some examples, the solvent can be solely aprotic hydrocarbon solvents, or alternatively solely halogenated solvents, or alternatively a mixture of both halogenated and non-halogenated solvents. Therefore, most commonly, the solvent or diluent is or includes an optionally halogenated hydrocarbon, e.g., pentane, hexane, heptane, cyclohexane, methylene chloride, chloroform, chlorobenzene and/or tetrachloromethane, or a mixture of these. In some examples, only aprotic solvents are used, and which can be the same solvent employed in the sulfonation reaction. This reduces cost and time of the process as it permits the functionalization reaction to be conveniently conducted after sulfonation without further solvent treatment steps.

The reaction temperature may vary depending on the type of initiator and halogenating agent, and is normally controlled within the range of room temperature (~25° C.) and about 100° C. When a combination of NBS and AIBN is used, the reaction temperature is usually controlled in the range of from about 50 to about 80° C.

As those having ordinary skill in the art will appreciate, when formula (III.a) represents a monomer an alkyl group in the position of $R^1$ may have an allylic methylene group. Accordingly, the approach via allylic halogenation of monomers is preferably used for monomers as represented by formula (III.a) in which $R^1$ is hydrogen or is a tertiary alkyl group, more preferably hydrogen or a tertiary alkyl group.

(C) Direct Quaternization

As noted in the foregoing, the direct quaternization may be conducted using a membrane which comprises the halogenated block copolymer as represented by formula (II.a), which comprises at least one interior block D* having one or more polymer units as represented by formula (II), or may be effected using a solution or dispersion of the halogenated block copolymer as represented by formula (II.a) as starting material. Quaternization can be carried out using conditions similar to those commonly employed in the art. Illustrative descriptions of suitable conditions are found, e.g., in U.S. Pat. No. 5,814,672, U.S. Pat. No. 7,081,484, U.S. Pat. No. 8,148,030, US 2010/0137460, and US 2011/0207028, and in Vinodh et al., J. Biosci. Tech. 1(1), 45-51 (2009).

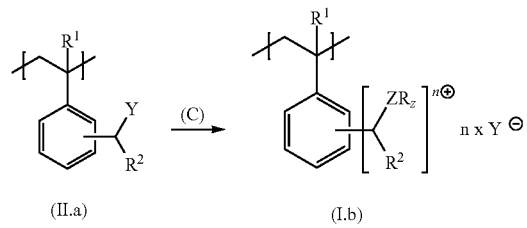

(II.a)  (I.b)

In general, the quaternization of a pre-formed membrane is effected by soaking the pre-formed membrane comprising the halogenated block copolymer represented by formula (II.a) in an appropriate amine or phosphine of formula (V.a), or a solution thereof,

(V.a)

wherein Z and R have the aforementioned meaning and $R^d$ is hydrogen or alkyl as in general and in particular specified for R, or $R^d$ together with $—ZR_2$ forms a heterocyclic group as herein above specified. $R^d$ of formula (V.a) corresponds to one of the z groups R depicted in formula (I.b).

The medium used to dissolve the compound of formula (V), and to soak the pre-formed membrane, normally is a protic or an aprotic polar solvent or mixture of solvents. Suitable solvents and solvent mixtures include, e.g., water, aliphatic alcohols, ketones, esters, ethers, and non-aqueous or aqueous mixtures thereof.

Alternatively, a solution or dispersion of the halogenated block copolymer as represented by formula (II.a) may be combined with amine or phosphine of formula (V.a), or a solution thereof, prior to membrane casting.

The direct quaternization approach, while generally useful to produce the corresponding onium salts of the functionalized block copolymers disclosed herein, is particularly suited to introduce functional groups which are based on an amine or phosphine of formula (V.a) in which $R^d$ is different from hydrogen. The direct quaternization, also, may be a convenient approach to prepare membranes comprising a functionalized block copolymer in accordance with the present disclosure when such membranes cannot be cast from the functionalized block copolymer directly, or when casting the functionalized block copolymer into suitable membranes poses problems.

(D) Functionalization

The functionalization in accordance with path (D) is essentially similar to the direct quaternization in which an amine or phosphine of formula (V.a) is used wherein $R^d$ denotes hydrogen, i.e., formula (V.b).

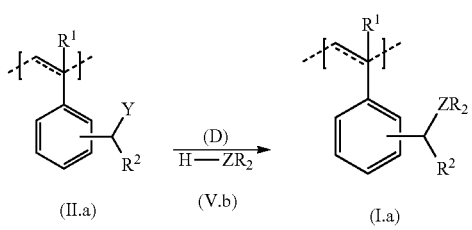

Accordingly, the functionalization may be effected by soaking a pre-formed membrane comprising the halogenated block copolymer represented by formula (II.a) in a solution comprising the amine or phosphine of formula (V.b) as described in the foregoing, or may be effected prior to membrane casting using a solution or dispersion of the halogenated block copolymer represented by formula (II.a). If desired, onium salts of the functionalized block copolymer of formula (I.b) with hydro halogenic acid can be converted to the non-salt form in a conventional manner, e.g., by treatment with an inorganic base such as a hydroxide of an alkali or alkaline earth metal.

Alternatively, the halogenated monomer as represented by formula (II.a) can be used as starting material. Under those circumstances, the monomer is dissolved or dispersed in a solvent or solvent mixture for treatment with the amine or phosphine of formula (V.b). Suitable solvents include the aforementioned protic or aprotic polar solvents as well as apolar solvents such as optionally halogenated hydrocarbons.

The monomers corresponding to formula (I.a) can be block copolymerized in a customary fashion. Therefore, the monomers of formula (I.a) are particularly useful in that they allow convenient access to a variety of embodiments of the functionalized block copolymers which pose synthetic challenges when the halogenation is conducted after the block copolymerization. In particular, the monomers of formula (I.a) can be used to form functionalized block copolymers having at least one block A and/or a block B which is susceptible to halogenation or haloalkylation, i.e., blocks comprising units of formula (III.a) or (IV.a) and blocks comprising non-hydrogenated polymerized conjugated dienes.

(E) Indirect Quaternization

The block copolymer corresponding to formula (I.a) can be quaternized to obtain the corresponding onium salt thereof using any of the procedures in principle known in the art for that purpose.

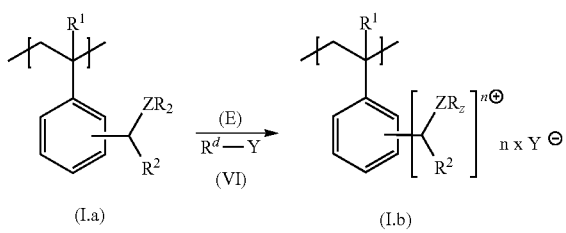

$R^d$ and Y in the foregoing formula (VI) in general and in particular have the meaning stated above. In the foregoing reaction scheme, $R^d$ of formula (VI) corresponds to one of the z groups R depicted in formula (I.b) and/or is attached to a nitrogen which forms part of one of the groups R corresponding, e.g., to $R^c$ in the illustrative formulae (I$^{ii}$) to (I$^{iv}$).

The indirect quaternization can be effected using a pre-formed membrane comprising the functionalized block copolymer as represented by formula (I.a) as the starting material, or may be effected prior to membrane casting using a solution or dispersion of the functionalized block copolymer as represented by formula (I.a). Accordingly, the quaternization of the functionalized block copolymer represented by formula (I.a) can be effected by soaking a pre-formed membrane in an appropriate compound of formula (VI) or a solution thereof. Alternatively, a solution or dispersion of the functionalized polymer as represented by formula (I.a) can be used as starting material. Under those circumstances, the functionalized polymer is dissolved or dispersed in a solvent or solvent mixture. Suitable solvents include the aforementioned protic or aprotic polar solvents as well as apolar solvents such as optionally halogenated hydrocarbons.

The medium which can be used to dissolve the compound of formula (VI), and to soak the preformed membrane, normally is polar or apolar solvent or mixture of solvents. Suitable solvents and solvent mixtures include, e.g., aliphatic alcohols, ketones, esters, ethers, optionally halogenated hydrocarbons, and non-aqueous or aqueous mixtures thereof.

The onium salt of the functionalized block copolymer as represented by formula (I.b) has anion exchange properties. Accordingly, the anions which are present in the onium salt due to the manner of synthesis may be replaced easily in a conventional manner by other anions as hereinbefore mentioned.

(F) Block Copolymerization

The functionalized block copolymers as, e.g., represented by formula (I.a), the corresponding selectively halogenated block copolymers as, e.g., represented by formula (II.a), as well as the precursor block copolymers as, e.g., represented by formulae (III.a) and (IV.a), can be prepared by block copolymerization methods conventionally used for the block copolymerization of styrene block copolymers. Conveniently, the respective block copolymers are block copolymerized via an anionic polymerization process in which the suitable monomers are polymerized in solution in the presence of a lithium initiator. The solvent used as the polymerization vehicle may be any hydrocarbon that does not react with the living anionic chain end of the forming polymer, is easily handled in commercial polymerization units, and offers the appropriate solubility characteristics for the product polymer. For example, non-polar aliphatic hydrocarbons, which are generally lacking in ionizable hydrogen atoms make particularly suitable solvents. Frequently used are cyclic alkanes, such as cyclopentane, cyclohexane, cycloheptane, and cyclooctane, all of which are relatively non-polar. Other suitable solvents will be known to those skilled in the art and can be selected to perform effectively in a given set of process conditions, with polymerization temperature being one of the major factors taken into consideration.

Starting materials for preparing the respective block copolymers include the initial monomers noted above. Other important starting materials for anionic copolymerizations include one or more polymerization initiators. Suitable initiators include, for example, alkyl lithium compounds such as s-butyllithium, n-butyllithium, tert-butyllithium, amyllithium and the like and other organo lithium compounds including di-initiators such as the di-sec-butyl-lithium adduct of m-diisopropenyl benzene. Further suitable di-initiators are disclosed in U.S. Pat. No. 6,492,469. Of the various polymerization initiators, s-butyllithium is preferred. The initiator can be used in the polymerization mixture (including monomers and solvent) in an amount calculated on the basis of one initiator molecule per desired polymer chain. The lithium initiator process is well known and is described in, for example, U.S. Pat. Nos. 4,039,593 and Re. 27,145.

Polymerization conditions to prepare the respective block copolymers are typically similar to those used for anionic polymerizations in general. In the present invention polymerization is preferably carried out at a temperature of from about −30° C. to about 150° C., more preferably about 10° C. to about 100° C., and most preferably, in view of industrial limitations, from about 30° C. to about 90° C. The polymerization is carried out in an inert atmosphere, preferably nitrogen, and may also be accomplished under pressure within the range of from about 0.5 to about 10 bars. This copolymerization generally requires less than about 12 hours, and can be accomplished in from about 5 minutes to about 5 hours, depending upon the temperature, the concentration of the monomer components, and the desired molecular weight of the polymer or polymer block. When two or more of the monomers are used in combination, any copolymerization form selected from random, block, tapered block, controlled distribution block, and the like copolymerization forms may be utilized.

It is recognized that the anionic polymerization process may be moderated by the addition of a Lewis acid, such as an aluminum alkyl, a magnesium alkyl, a zinc alkyl or combinations thereof. The effects of the added Lewis acid on the polymerization process are 1) to lower the viscosity of the living polymer solution allowing for a process that operates at higher polymer concentrations and thus uses less solvent, 2) to enhance the thermal stability of the living polymer chain end which permits polymerization at higher temperatures and again, reduces the viscosity of the polymer solution allowing for the use of less solvent, and 3) to slow the rate of reaction which permits polymerization at higher temperatures while using the same technology for removing the heat of reaction as had been used in the standard anionic polymerization process. The processing benefits of using Lewis acids to moderate anionic polymerization techniques have been disclosed in U.S. Pat. No. 6,391,981, U.S. Pat. No. 6,455,651, and U.S. Pat. No. 6,492,469. Related information is disclosed in U.S. Pat. No. 6,444,767 and U.S. Pat. No. 6,686,423. The polymer made by such a moderated, anionic polymerization process can have the same structure as one prepared using the conventional anionic polymerization process and as such, this process can be useful in making the respective block copolymers. For Lewis acid moderated, anionic polymerization processes, reaction temperatures between 100° C. and 150° C. are preferred as at these temperatures it is possible to take advantage of conducting the reaction at very high polymer concentrations. While a stoichiometric excess of the Lewis acid may be used, in most instances there is not sufficient benefit in improved processing to justify the additional cost of the excess Lewis acid. It is preferred to use from about 0.1 to about 1 mole of Lewis acid per mole of living, anionic chain ends to achieve an improvement in process performance with the moderated, anionic polymerization technique.

Preparation of radial (branched) polymers requires a post-polymerization step called "coupling." In the above radial formulas n is an integer of from 2 to about 30, preferably from about 2 to about 15, and more preferably from 2 to 6, and X is the remnant or residue of a coupling agent. A variety of coupling agents is known in the art and can be used in preparing the coupled block copolymers of the present invention. These include, for example, dihaloalkanes, silicon halides, siloxanes, multifunctional epoxides, silica compounds, esters of monohydric alcohols with carboxylic acids, (e.g. methylbenzoate and dimethyl adipate) and epoxidized oils. Star-shaped polymers are prepared with polyalkenyl coupling agents as disclosed in, for example, U.S. Pat. No. 3,985,830, U.S. Pat. No. 4,391,949, U.S. Pat. No. 4,444,953, and CA 716,645. Suitable polyalkenyl coupling agents include divinylbenzene, and preferably m-divinylbenzene. Preferred are tetra-alkoxysilanes such as tetra-methoxysilane (TMOS) and tetra-ethoxysilane (TEOS), tri-alkoxysilanes such as methyltrimethoxysilane (MTMS), aliphatic diesters such as dimethyl adipate and diethyl adipate, and diglycidyl aromatic epoxy compounds such as diglycidyl ethers deriving from the reaction of bis-phenol A and epichlorohydrin.

In particular embodiments it has surprisingly been found that functionalized monomers can be block copolymerized under similar or corresponding conditions. In some of these embodiments, the functionalized monomer is a styrene monomer as represented by formula (I.a) in which the moiety —$ZR_2$ denotes a piperidyl or dimethylamino group or the like. The respective monomers can be prepared as described above. Conveniently, p-chloromethylstyrene which is commercially available can be used as starting material to make the functionalized monomers.

(H) Optional Hydrogenation of Segments Comprising Conjugated Dienes

As noted, in some cases it is necessary to selectively hydrogenate the block copolymer to remove any ethylenic unsaturation which could render blocks A and/or B susceptible to halogenation or haloalkylation. Also, hydrogenation generally improves thermal stability, ultraviolet light stability, oxidative stability, and, therefore, weatherability of the final polymer.

Hydrogenation can be carried out via any of the several hydrogenation or selective hydrogenation processes generally known in the art. For example, such hydrogenation has been accomplished using methods such as those taught in, for example, U.S. Pat. No. 3,595,942, U.S. Pat. No. 3,634,549, U.S. Pat. No. 3,670,054, U.S. Pat. No. 3,700,633, and US Re. 27,145. Accordingly, polymers containing ethylenic unsaturation hydrogenated using a suitable catalyst. Such catalyst, or catalyst precursor, preferably comprises a Group 9 or 10 metal such as nickel or cobalt which is combined with a suitable reducing agent such as an aluminum alkyl or hydride of a metal selected from Groups 1, 2 and 13 of the Periodic Table of the Elements, particularly lithium, magnesium or aluminum. The hydrogenation can be accomplished in a suitable solvent or diluent at a temperature from about 20° C. to about 120° C. Other catalysts that are useful include titanium based catalyst systems.

Hydrogenation can be carried out under such conditions that at least about 90 percent of the conjugated diene double bonds have been reduced, and between zero and 10 percent of the arene double bonds have been reduced. Preferred ranges are at least about 95 percent of the conjugated diene double bonds reduced, and more preferably about 98 percent of the conjugated diene double bonds are reduced.

Once the hydrogenation is complete, it is preferable to oxidize and extract the catalyst by stirring with the polymer solution a relatively large amount of aqueous acid (preferably 1 to 30 percent by weight acid), at a volume ratio of about 0.5 parts aqueous acid to 1 part polymer solution. The nature of the acid is not critical. Suitable acids include phosphoric acid, sulfuric acid and organic acids. This stirring is continued at about 50° C. for from about 30 to about 60 minutes while sparging with a mixture of oxygen in nitrogen. Care must be exercised in this step to avoid forming an explosive mixture of oxygen and hydrocarbons.

3. PARTICULAR PRECURSOR AND INTERMEDIATE BLOCK COPOLYMERS

The selectively halogenated block copolymers as represented by formula (II.a) as well as the precursor block copolymers as represented by formulae (III.a) are specifically adapted to serve as precursor and/or intermediate materials for the manufacture of the functionalized block copolymers disclosed herein.

(A) The Selectively Halogenated Block Copolymer

Broadly, the selectively halogenated block copolymer of the present disclosure corresponds to the functionalized block copolymer with the difference that at least one selectively halogenated interior block D* is present instead of the at least one interior block D of the functionalized block copolymers. More specifically, the selectively halogenated block copolymer of the present disclosure comprises:

(a) at least two end blocks A, wherein each end block A is essentially non-halogenated, has a number average molecular weight of from about 1,000 to about 60,000, and has a high service temperature; and (b) at least one interior block D* having a number average weight of from about 1,000 to about 100,000 and comprising on average at least one polymer unit of formula (II)

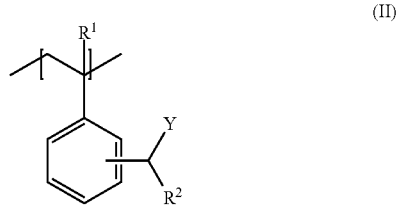

(II)

wherein
Y is halogen;
$R^1$ is hydrogen or alkyl; and
$R^2$ is hydrogen or is tertiary alkyl.

The end blocks A of the selectively halogenated block copolymer, as well as any interior blocks A, are essentially non-halogenated thus allowing that the functionalization of the selectively halogenated block copolymer yields a functionalized block copolymer in which the A blocks are substantially free of amino- or phosphino-functional groups.

Corresponding to the blocks A of the functionalized block copolymer, the individual A blocks of the selectively halogenated block copolymer may be identical or different and, preferably, are similar, although not necessarily identical, in the nature and in the composition of the monomers which make up each of the individual A blocks. The description of the A blocks provided in the context of the functionalized block copolymer in general and in particular equally applies to the A blocks of the halogenated block copolymer.

Accordingly, in particular embodiments, each of the blocks A is independently selected from the group consisting of polymerized (i) ethylene monomers; (ii) propylene monomers, (iii) styrene and alpha-alkyl styrene monomers having a phenyl ring which is optionally substituted by one or more alkyl groups, (iv) (meth)acrylate ester monomers, and (v) mixtures of monomers selected from (i) to (iv).

As is the case for the functionalized block copolymers of the present disclosure, the selectively halogenated block copolymers optionally comprise at least one interior block B, wherein each block B is essentially non-halogenated, has a number average molecular weight of from about 1,000 to about 100,000, and has a glass transition temperature of at most about 20° C.

As the block B of the halogenated block copolymer corresponds to the block B of the functionalized block copolymer, the description of the B blocks provided in the context of the functionalized block copolymer in general and in particular equally applies to the B blocks of the halogenated block copolymer. That is, the individual B blocks of the selectively halogenated block copolymer may be identical or different and, preferably, are similar, although not necessarily identical, in the nature and in the composition of the monomers which make up each of the individual B blocks.

In particular embodiments, each block B is independently selected from the group consisting of polymerized (i) ethylene monomers, (ii) $C_3$-$C_8$ alpha-olefin monomers, (iii) isobutylene monomers, (iv) conjugated diene monomers, (v) (meth)acrylate ester monomers, (vi) a silicon polymer, and (vii) mixtures of monomers selected from (i) to (v), wherein segments containing polymerized conjugated diene monomers are hydrogenated.

As noted previously, the interior block(s) D* which characterizes the selectively halogenated block copolymer is the precursor of the functionalized block(s) D of the functionalized block copolymer. Accordingly, each block D* has a number average molecular weight of from about 1,000 to about 100,000 and comprises, on average, at least one halogenated polymer unit of formula (II)

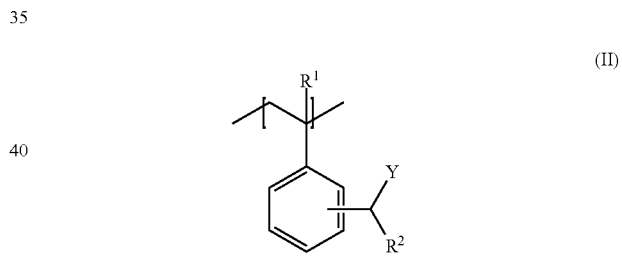

(II)

wherein
Y is halogen, preferably chlorine or bromine;
$R^1$ is hydrogen or alkyl as mentioned in general and in particular hereinbefore; and
$R^2$ is hydrogen or is tertiary alkyl as mentioned in general and in particular hereinbefore.

In particular, the position in which the moiety —$CHR^2$—Y is bonded to the phenyl ring in formula (II) is generally not critical, and the moiety may be linked to the 2-position (ortho), 3-position (meta), or 4-position (para). In some of the embodiments, the moiety preferably is linked in the 2- or 4-position, more preferably the 4-position, of the phenyl ring.

The selectively halogenated block copolymer units of formula (II) which distinguish the D* block are derived from (alkyl)styrene or (alkyl)styrene wherein the phenyl ring is substituted by a primary alkyl group, i.e., —$CH_2$—$R^2$. Accordingly, each D* block, independently, is selected from the group of (i) segments derived from homo- and copolymers of styrene, (ii) segments derived from homo- and copolymers of styrene having a phenyl ring which is substituted by a primary alkyl group, (iii) segments derived from homo- and copolymer of alpha-alkyl styrene, and (iv) segments derived from homo- and copolymers of alpha-alkyl styrene having a phenyl ring which is substituted by a primary alkyl group.

In general, the selectively halogenated interior block D* comprises on average at least one halogenated polymer unit of formula (II). However, as the amount of halogenated polymer units corresponds to the amount of functional groups which can be introduced to produce the functionalized block copolymer, it is generally preferred that at least 5% of the (alkyl)styrene derived polymer units of the D* block are polymer units of formula (II). In some of these preferred embodiments, at least 10%, or at least 15%, or at least 20%, or at least 25%, or at least 30% of the (alkyl)styrene derived polymer units of the D* block are polymer units of formula (II).

In some embodiments, 100% of the (alkyl)styrene derived polymer units of the D* block are polymer units of formula (II). In other embodiments, on average up to 98%, or up to 95%, or up to 90%, or up to 85%, of the (alkyl)styrene derived polymer units of the D* block are polymer units of formula (II).

Accordingly, in some of the embodiments, on average from 10% to 100%, or from 15% to 100%, or from 20% to 100%, or from 25% to 100%, or from 30% to 100%, of the (alkyl)styrene derived polymer units of the D* block are polymer units of formula (II). In further embodiments, on average from 10% to 98%, or from 15% to 98%, or from 20% to 98%, or from 25% to 98%, or from 30% to 98%, of the (alkyl)styrene derived polymer units of the D* block are polymer units of formula (II). In some of the embodiments, on average from 10% to 95%, or from 15% to 95%, or from 20% to 95%, or from 25% to 95%, or from 30% to 95%, of the (alkyl)styrene derived polymer units of the D* block are polymer units of formula (II). In other embodiments, on average from 10% to 90%, or from 15% to 90%, or from 20% to 90%, or from 25% to 90%, or from 30% to 90%, of the (alkyl)styrene derived polymer units of the D* block are polymer units of formula (II). In yet further embodiments, on average from 10% to 85%, or from 15% to 85%, or from 20% to 85%, or from 25% to 85%, or from 30% to 85%, of the (alkyl)styrene derived polymer units of the D* block are polymer units of formula (II).

When multiple blocks D* are present in the selectively halogenated block copolymer, the individual blocks D* may be identical or different. Differences between multiple blocks D* may reside in one or more of (i) the number average molecular weight, (ii) the number of halogenated block copolymer units of formula (II), (iii) the presence or absence of co-polymerized monomers, and (iv) where present, the amount and the nature of such co-polymerized monomers. When multiple blocks D* are present, the individual D* blocks preferably are similar, although not necessarily identical, in the nature and in the composition of the monomers which make up each of the individual D* blocks.

The co-monomers which may be copolymerized with the aforementioned (alkyl)styrene units of the block(s) D* are not particularly restricted. Essentially all of the monomers mentioned in the context of the blocks A and B are suitable. When two or more of the monomers are used in combination, any copolymerization form selected from random, block, tapered block, controlled distribution block, and the like copolymerization forms may be utilized. For example, the D* blocks may be derived from (alkyl)styrene-co-[conjugated diene] blocks having a controlled distribution of the co-monomers in which copolymerized conjugated diene polymer units are selectively hydrogenated, such as disclosed in U.S. Pat. No. 7,169,848.

When the D* blocks are derived from copolymers of the aforementioned (alkyl)styrenes, the (alkyl)styrene polymer units should constitute on average at least about 10% of the co-polymerized polymer block units. In some embodiments, the (alkyl)styrene polymer units of such co-polymerized block(s) D* constitute on average at least about 15%, or at least about 20%, or at least about 25%, or at least about 30%, of the co-polymerized polymer block units. In other embodiments, the aforementioned (alkyl)styrenes of such co-polymerized block(s) D* constitute on average at most about 80%, or at most about 75%, or at most about 70%, of the co-polymerized polymer block units.

Accordingly, in some of the embodiments in which a block D* is derived from copolymers of the aforementioned (alkyl)styrenes the (alkyl)styrene polymer units should constitute on average from about 10% to about 80%, or from about 15% to about 80%, or from about 20% to about 80%, or from about 25% to about 80%, or from about 30% to about 80%, of the co-polymerized polymer block units. In further embodiments in which a block D* is derived from copolymers of the aforementioned (alkyl)styrenes the (alkyl)styrene polymer units should constitute on average from about 10% to about 75%, or from about 15% to about 75%, or from about 20% to about 75%, or from about 25% to about 75%, or from about 30% to about 75%, of the co-polymerized polymer block units. In other embodiments in which a block D* is derived from copolymers of the aforementioned (alkyl)styrenes the (alkyl)styrene polymer units should constitute on average from about 10% to about 70%, or from about 15% to about 70%, or from about 20% to about 70%, or from about 25% to about 70%, or from about 30% to about 70%, of the co-polymerized polymer block units.

In particular embodiments, each block D* consists of polymer units of formula (II), and optionally polymer units derived from one or more monomers selected from the group consisting of styrene and alpha-alkyl styrene in each case having a phenyl ring which is optionally substituted by a primary alkyl group.

The A, D* and optional B blocks of the selectively halogenated block copolymer may be arranged in various configurations so long as the end blocks of such configurations are A blocks, i.e., the D* block(s) and optional B block(s) are interior blocks. In some embodiments, the selectively halogenated block copolymers comprise, in addition to the mandatory A and D* blocks, at least one further block B. In particular embodiments, the selectively halogenated block copolymers have a general configuration A-D*-A, A-D*-A-D*-A, (A-D*-A)$_n$X, (A-D*)$_n$ X, A-B-D*-B-A, A-D*-B-D*-A, (A-B-D*)$_n$X, (A-D*-B)$_n$X, or mixtures thereof, wherein n is an integer from 2 to about 30, and X is a coupling agent residue, and wherein the plurality of A blocks, B blocks, or D* blocks are the same or different. In further particular embodiments, the selectively halogenated block copolymers have a general configuration A-B-D*-B-A, A-D*-B-D*-A, (A-B-D*)$_n$X, (A-D*-B)$_n$X, or mixtures thereof, wherein n is an integer from 2 to about 30, and X is a coupling agent residue, and wherein the plurality of A blocks, B blocks, or D* blocks are the same or different.

(B) The Precursor Block Copolymer

Broadly, the precursor block copolymer of the present disclosure corresponds to some of embodiments of the functionalized block copolymer with the difference that at least one d interior block D° is present which can be selectively halogenated and functionalized and, thus, can be selectively converted into the at least one interior block D of the functionalized block copolymers. More specifically, the precursor block copolymer of the present disclosure comprises:

(a) at least two end blocks A, wherein each end block A is substantially resistant to halogenation, has a number average molecular weight of from about 1,000 to about 60,000, and has a high service temperature; and (b) at least one interior block D° having a number average weight of from about 1,000 to about 100,000 and comprising on average at least one polymer unit of formula (III)

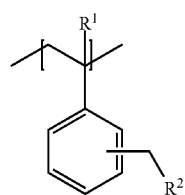

(III)

wherein
$R^1$ is hydrogen or alkyl; and
$R^2$ is hydrogen or is tertiary alkyl.

The end blocks A of the precursor block copolymer, as well as any interior blocks A, are substantially resistant to halogenation thus allowing that the precursor block copolymer is selectively halogenated in the interior block(s) D° to yield the selectively halogenated block copolymer addressed herein above.

Corresponding to the blocks A of the functionalized block copolymer, the individual A blocks of the precursor block copolymer may be identical or different and, preferably, are similar, although not necessarily identical, in the nature and in the composition of the monomers which make up each of the individual A blocks. The description of the A blocks provided in the context of the functionalized block copolymer in essentially also applies to the A blocks of the precursor block copolymer with the difference that styrene and alpha-alkyl styrene monomers used in the preparation of the individual A blocks of the precursor block copolymer are substituted in the phenyl ring such as to render them substantially resistant to haloalkylation and halogenation.

Accordingly, in particular embodiments, each of the blocks A is independently selected from the group consisting of polymerized (i) ethylene monomers; (ii) propylene monomers, (iii) styrene and alpha-alkyl styrene monomers having a phenyl ring which is substituted by one or more tertiary alkyl groups, (iv) (meth)acrylate ester monomers, and (v) mixtures of monomers selected from (i) to (iv).

As is the case for the functionalized block copolymers of the present disclosure, the precursor block copolymers optionally comprise at least one interior block B, wherein each block B is essentially non-functionalized, is substantially resistant to halogenation, has a number average molecular weight of from about 1,000 to about 100,000, and has a glass transition temperature of at most about 20° C.

As the block B of the precursor block copolymer corresponds to the block B of certain embodiments of the functionalized block copolymer, the description of the B blocks provided in the context of the functionalized block copolymer in general and in particular essentially also applies to the B blocks of the precursor block copolymer. That is, the individual B blocks of the selectively halogenated block copolymer may be identical or different and, preferably, are similar, although not necessarily identical, in the nature and in the composition of the monomers which make up each of the individual B blocks.

In particular embodiments, each block B is independently selected from the group consisting of polymerized (i) ethylene monomers, (ii) $C_3$-$C_8$ alpha-olefin monomers, (iii) isobutylene monomers, (iv) conjugated diene monomers, (v) (meth)acrylate ester monomers, (vi) a silicon polymer, and (vii) mixtures of monomers selected from (i) to (v), wherein segments containing polymerized conjugated diene monomers are hydrogenated.

As noted previously, the interior block(s) D° which characterizes the precursor block copolymer is the precursor of the selectively halogenated block(s) D* which, in turn, is the precursor of the functionalized block(s) D of the functionalized block copolymer. Accordingly, each block D° has a number average molecular weight of from about 1,000 to about 100,000 and comprises, on average, at least one polymer unit of formula (III)

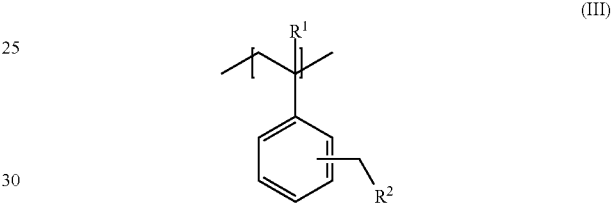

(III)

which is susceptible to halogenation and wherein
$R^1$ is hydrogen or alkyl as mentioned in general and in particular hereinbefore; and
$R^2$ is hydrogen or is tertiary alkyl as mentioned in general and in particular hereinbefore.

The position in which the moiety —$CH_2$—$R^2$ is bonded to the phenyl ring in formula (III) is generally not critical, and the moiety may be linked to the 2-position (ortho), 3-position (meta), or 4-position (para). In some of the embodiments, the moiety preferably is linked in the 2- or 4-position, more preferably the 4-position, of the phenyl ring.

The selectively halogenated block copolymer units of formula (III) which distinguish the D° block are derived from (alkyl)styrene wherein the phenyl ring is substituted by a primary alkyl group, i.e., —$CH_2$—$R^2$. Accordingly, each D° block, independently, is selected from the group of (i) homo- and copolymers of styrene, (ii) homo- and copolymers of styrene having a phenyl ring which is substituted by a primary alkyl group, (iii) homo- and copolymer of alpha-alkyl styrene, and (iv) homo- and copolymers of alpha-alkyl styrene having a phenyl ring which is substituted by a primary alkyl group.

In general, the interior block D° comprises on average at least one precursor polymer unit of formula (III). However, as the amount of polymer units which are susceptible to halogenation corresponds to the amount of functional groups which can be introduced to produce the functionalized block copolymer, it is generally preferred that at least 5% of the (alkyl)styrene derived polymer units of the D° block are polymer units of formula (III). In some of these preferred embodiments, at least 10%, or at least 15%, or at least 20%, or at least 25%, or at least 30% of the (alkyl)styrene derived polymer units of the D° block are polymer units of formula (III).

In some embodiments, 100% of the (alkyl)styrene derived polymer units of the D° block are polymer units of formula (III). In other embodiments, on average up to 98%, or up to 95%, or up to 90%, or up to 85%, of the (alkyl)styrene derived polymer units of the D° block are polymer units of formula (III).

Accordingly, in some of the embodiments, on average from 10% to 100%, or from 15% to 100%, or from 20% to 100%, or from 25% to 100%, or from 30% to 100%, of the (alkyl)styrene polymer units of the D° block are polymer units of formula (III). In further embodiments, on average from 10% to 98%, or from 15% to 98%, or from 20% to 98%, or from 25% to 98%, or from 30% to 98%, of the (alkyl)styrene polymer units of the D° block are polymer units of formula (III). In some of the embodiments, on average from 10% to 95%, or from 15% to 95%, or from 20% to 95%, or from 25% to 95%, or from 30% to 95%, of the (alkyl)styrene polymer units of the D° block are polymer units of formula (III). In other embodiments, on average from 10% to 90%, or from 15% to 90%, or from 20% to 90%, or from 25% to 90%, or from 30% to 90%, of the (alkyl)styrene polymer units of the D° block are polymer units of formula (III). In yet further embodiments, on average from 10% to 85%, or from 15% to 85%, or from 20% to 85%, or from 25% to 85%, or from 30% to 85%, of the (alkyl)styrene polymer units of the D° block are polymer units of formula (III).

When multiple blocks D° are present in the precursor block copolymer, the individual blocks D° may be identical or different. Differences between multiple blocks D° may reside in one or more of (i) the number average molecular weight, (ii) the number of precursor block copolymer units of formula (III), (iii) the presence or absence of co-polymerized monomers, and (iv) where present, the amount and the nature of such co-polymerized monomers. When multiple blocks D° are present, the individual D° blocks preferably are similar, although not necessarily identical, in the nature and in the composition of the monomers which make up each of the individual D° blocks.

The co-monomers which may be copolymerized with the aforementioned (alkyl)styrene units of the block(s) D° are not particularly restricted. Essentially all of the monomers mentioned in the context of the blocks A and B are suitable. When two or more of the monomers are used in combination, any copolymerization form selected from random, block, tapered block, controlled distribution block, and the like copolymerization forms may be utilized. For example, the D° blocks may be derived from (alkyl)styrene-co-[conjugated diene] blocks having a controlled distribution of the co-monomers in which copolymerized conjugated diene polymer units are selectively hydrogenated, such as disclosed in U.S. Pat. No. 7,169,848.

When the D° blocks are derived from copolymers of the aforementioned (alkyl)styrenes, the (alkyl)styrene polymer units should constitute on average at least about 10% of the co-polymerized polymer block units. In some embodiments, the (alkyl)styrene polymer units of such co-polymerized block(s) D° constitute on average at least about 15%, or at least about 20%, or at least about 25%, or at least about 30%, of the co-polymerized polymer block units. In other embodiments, the aforementioned (alkyl)styrenes of such co-polymerized block(s) D° constitute on average at most about 80%, or at most about 75%, or at most about 70%, of the co-polymerized polymer block units.

Accordingly, in some of the embodiments in which a block D° is derived from copolymers of the aforementioned (alkyl)styrenes, the (alkyl)styrene polymer units should constitute on average from about 10% to about 80%, or from about 15% to about 80%, or from about 20% to about 80%, or from about 25% to about 80%, or from about 30% to about 80%, of the co-polymerized polymer block units. In further embodiments in which a block D° is derived from copolymers of the aforementioned (alkyl)styrenes, the (alkyl)styrene polymer units should constitute on average from about 10% to about 75%, or from about 15% to about 75%, or from about 20% to about 75%, or from about 25% to about 75%, or from about 30% to about 75%, of the co-polymerized polymer block units. In other embodiments in which a block D° is derived from copolymers of the aforementioned (alkyl)styrenes, the (alkyl)styrene polymer units should constitute on average from about 10% to about 70%, or from about 15% to about 70%, or from about 20% to about 70%, or from about 25% to about 70%, or from about 30% to about 70%, of the co-polymerized polymer block units.

In particular embodiments, each block D° consists of polymer units of formula (III), and optionally polymer units derived from one or more monomers selected from the group consisting of styrene and alpha-alkyl styrene.

The A, D° and optional B blocks of the precursor block copolymer may be arranged in various configurations so long as the end blocks of such configurations are A blocks, i.e., the D° block(s) and optional B block(s) are interior blocks. In some embodiments, the precursor block copolymers comprise, in addition to the mandatory A and D* blocks, at least one further block B. In particular embodiments, the precursor block copolymers have a general configuration A-D°-A, A-D°-A-D°-A, (A-D°-A)$_n$X, (A-D°)$_n$X, A-B-D°-B-A, A-D°-B-D°-A, (A-B-D°)$_n$X, (A-D°-B)$_n$X, or mixtures thereof, wherein n is an integer from 2 to about 30, and X is a coupling agent residue, and wherein the plurality of A blocks, B blocks, or D° blocks are the same or different. In further particular embodiments, the precursor block copolymers have a general configuration A-B-D°-B-A, A-D°-B-D°-A, (A-B-D°)$_n$X, (A-D°-B)$_n$X, or mixtures thereof, wherein n is an integer from 2 to about 30, and X is a coupling agent residue, and wherein the plurality of A blocks, B blocks, or D° blocks are the same or different.

4. MEMBRANES OR FILMS OF THE FUNCTIONALIZED BLOCK COPOLYMERS

The functionalized block copolymers of the present disclosure are particularly suited as materials for films or membranes, including coatings. Such films or membranes may be obtained by
 a) providing a composition comprising the functionalized block copolymer in a liquid phase comprising one or more aprotic organic solvents,
 b) casting the composition, and
 c) evaporating the liquid phase.

The nature and composition of the liquid phase is generally not critical so long as aprotic organic solvent or solvent mixture is capable to dissolve or disperse the functionalized block copolymer to a degree which is sufficient to achieve a coating or film-casting composition of adequate homogeneity.

Suitable aprotic organic solvents include, e.g., optionally halogenated hydrocarbons having from 4 to 12 carbon atoms. The hydrocarbons may be straight-chained, branched or mono- or polycyclic and may comprise straight-chained, branched as well as mono- or polycyclic, optionally aromatic hydrocarbon groups such as, e.g., straight-chained, branched or cyclic pentane, (mono-, di- or tri-) methylcyclopentane, (mono-, di- or tri-) ethylcyclopentane, straight-chained, branched or cyclic hexane, (mono-, di- or tri-) methylcyclohexane, (mono-, di- or tri-) ethyl cyclohexane, straight-chained, branched or cyclic heptane, straight-chained, branched or (mono- or bi-) cyclic octane, 2-ethyl hexane, isooctane, nonane, decane, paraffinic oils, mixed paraffinic solvents, benzene, toluene and xylenes, and the like.

In some particular embodiments, the apolar liquid phase comprises at least one solvent selected from cyclohexane, methylcyclohexane, cyclopentane, cycloheptane, cyclooctane and mixtures thereof, with cyclohexane, and/or cyclopentane, and/or methylcyclohexane being most preferred.

In further particular embodiments, the apolar liquid phase is formed by at least two aprotic solvents each of which is preferably non-halogenated. In further particular embodiments, the non-polar liquid phase comprises at least one solvent selected from hexanes, heptanes and octanes and mixtures thereof, being mixed with cyclohexane and/or methylcyclohexane.

In yet further embodiments, the liquid phase is composed of at least two solvents selected from polar solvents and one non-polar solvents.

Preferably, the polar solvents are selected from water, alcohols having from 1 to 20 carbon atoms, preferably from 1 to 8 carbon atoms, more preferably from 1 to 4 carbon atoms; ethers having from 1 to 20 carbon atoms, preferably from 1 to 8 carbon atoms, more preferably from 1 to 4 carbon atoms, including cyclic ethers; esters of carboxylic acids, esters of sulfuric acid, amides, carboxylic acids, anhydrides, sulfoxides, nitriles, and ketones having from 1 to 20 carbon atoms, preferably from 1 to 8 carbon atoms, more preferably from 1 to 4 carbon atoms, including cyclic ketones. More specifically, the polar solvents are selected from methanol, ethanol, propanol, isopropanol, dimethyl ether, diethyl ether, dipropyl ether, dibutyl ether, substituted and unsubstituted furans, oxetane, dimethyl ketone, diethyl ketone, methyl ethyl ketone, substituted and unsubstituted tetrahydrofuran, methyl acetate, ethyl acetate, propyl acetate, methyl sulfate, dimethyl sulfate, carbon disulfide, formic acid, acetic acid, sulfoacetic acid, acetic anhydride, acetone, cresol, creosol, dimethylsulfoxide (DMSO), cyclohexanone, dimethyl acetamide, dimethyl formamide, acetonitrile, water and dioxane, with water, tetrahydrofuran, methanol, ethanol, acetic acid, sulfoacetic acid, methyl sulfate, dimethylsulfate, and isopropyl alcohol being the more preferred of the polar solvents.

Preferably the non-polar solvents are selected from toluene, benzene, xylene, mesitylene, hexanes, heptanes, octanes, cyclohexane, chloroform, dichloroethane, dichloromethane, carbon tetrachloride, triethylbenzene, methylcyclohexane, isopentane, and cyclopentane, with toluene, cyclohexane, methylcyclohexane, cyclopentane, hexanes, heptanes, isopentane, and dichloroethane being the most preferred non-polar solvents. As noted, the method utilizes two or more solvents.

This means that two, three, four or more solvents selected from polar solvents alone, non-polar solvents alone or a combination of polar solvents and non-polar solvents may be used. The ratio of the solvents to one another can vary widely. For example, in solvent mixtures having two solvents, the ratio can range from 99.99:0.01 to 0.01:99.99.

The concentration of the functionalized block copolymer(s) in the liquid phase depends on the nature of the functionalized block copolymer(s) and on factors such as the identity of the solvent or the solvent mixture. Generally, the polymer concentration falls within a range of from about 1% wt. to about 40% wt., alternatively from about 2%-wt. to about 35% wt., alternatively from about 3% wt. to about 30% wt., or a range of from about 1%-wt. to about 30% wt., alternatively from about 2% wt. to about 25% wt., alternatively from about 5% wt. to about 20% wt., based on the total weight of the solution or dispersion of the functionalized block copolymer(s). It will be understood by those skilled in the art that suitable ranges include any combination of the specified weight percentages even if the specific combination and range is not listed herewith.

The dispersion or solution of the functionalized block copolymer(s) in the liquid phase to obtain the composition (a) is achieved, for example, by combining requisite amounts of the functionalized block copolymer(s) and the solvent or solvent mixture at a temperature of from about 20° C. to the boiling point of the employed solvent or solvents. In general, the temperature is in a range of from about 20° C. to about 100° C., alternatively from about 20° C. to about 80° C., alternatively from about 20° C. to about 60 C, alternatively from about 25° C. to about 65° C., alternatively from about 25° C. to about 60° C. (e.g., at about 50° C.). The dispersing or dissolution time to obtain a composition of sufficient homogeneity can be in the range of from approximately less than 1 minute to approximately 24 hours or longer, dependent on the temperature, the solvent or solvent mixture, and the molecular weight and IEC of the polymer.

Those having ordinary skill will appreciate that the quality of the film or membrane may be influenced by the homogeneity of the composition (a). Thus, admixture of the functionalized block copolymer in the liquid phase advantageously may be aided by means of suitable mixing equipment or homogenizers known in the art. In most embodiments, conventional tank or pipe mixing procedures will be suited to obtain a composition of adequate homogeneity. In some embodiments it may be advantageous to homogenize the composition (a) in a conventional homogenizer. Those having skill in the art will appreciate that the thoroughness of mixing may also be facilitated by decreasing the concentration of the functionalized block copolymer. The choice of suitable equipment and concentrations will generally depend on ecologic and economic factors.

The compositions (a) generally may have a solids content up to about 70%-wt. although the films and membranes may not necessarily be prepared from compositions having the highest levels of solids. However, compositions (a) in which the solids levels and the concentrations are as high as possible are advantageous for storage or transport to minimize storage volume and shipping costs. Also, storage- and/or transport-grade compositions (a) can desirably be diluted prior to final use to a solids content or viscosity level which is suited for the purposes of a particular application. The thickness of the films or membranes to be prepared and the method of applying the composition to a substrate will usually dictate the solids level of the dispersion and the viscosity of the solution. Generally, when preparing films or membranes from a composition (a), the solids content will be from 1 to about 60% wt., preferably from about 5 to about 50% wt., or from about 10 to about 45% wt.

The thickness of the films and membranes, including coatings, for the applications described herein is not critical and usually will depend upon the target application of the films, membranes and coatings. Normally, the films and membranes may have a thickness of at least about 0.1 μm and at most about 1000 μm. Typically the thickness will range from about 0.5 to about 200 μm, e.g., from about 1 to about 100 μm, or from about 1 to about 35 μm.

Substrates which may be coated with the composition (a) include natural and synthetic, woven and non-woven materials as well as substrates made of one or more of such materials. The shape and form of the substrate may vary broadly, and include fibers, films, textiles, leather and wood parts or constructs. In some embodiments, the substrate is a microporous synthetic material such as polysulfone, polyethylene, polyimide, and the like.

Essentially, any fibrous material can be coated, impregnated or otherwise treated with the compositions (a) by methods well known to those skilled in the art, including carpets as well as textiles used in clothing, upholstery, tents, awnings, and the like. Suitable textiles include fabrics, yarns, and blends, whether woven, non-woven, or knitted, and whether natural, synthetic, or regenerated. Examples of suitable textiles include cellulose acetate, acrylics, wool, cotton, jute, linen, polyesters, polyamides, regenerated cellulose (Rayon), and the like.

The methods available for manufacturing such coated articles are in principle known in the art and include, for example, spray coating, electro-coating, direct coating, transfer coating, filtration, and a number of different film lamination processes. In a direct coating method, the composition (a) is cast onto the appropriate substrate, usually a textile, and subsequently dried, and optionally cured or crosslinked, e.g. under controlled conditions of temperature and dwell time or throughput. This provides a coated layer comprising the functionalized block copolymer on the substrate. The coated layer is typically non-microporous.

In this method, the coated layer may be provided either directly on the substrate, or the substrate may comprise one or more additional layers, e.g. polymer layers, on its surface. Moisture-vapor permeable tie or base coats and intermediate layers may, for example, be present on the substrate surface. For instance, the substrate may be a textile having a layer of foamed, microporous or hydrophilic polymer. Thus, multilayer coatings having several coated layers (and/or film layers) are provided. In some embodiments, the coating layer comprising the functionalized block copolymer is provided as the outermost layer.

In a transfer coating method, the composition (a) is cast onto a removable release substrate, e.g., release paper and then dried and optionally cured to provide a film or membrane on the release substrate. The film or membrane is typically non-microporous. The release substrate is, for example, a siliconized paper or blanket. The film or membrane may be stored and/or transported in this format prior to further use, or the release substrate may be removed prior to storage or use.

The film or membrane can typically then be bonded to a substrate material using thermal energy, or by using a layer of adhesive. The layer of adhesive may be applied to either the film or membrane, or to the substrate material or to both. The adhesive layer may be either continuous or discontinuous and typically comprises a foamed, microporous or hydrophilic polymer formulation. The release substrate is removed either before or after application of the film or membrane to the material.

In the foregoing manner, directly coated layers as well as multi-layer coatings may be produced. For example, the film which is applied to the material may be a pre-formed multilayer film, and/or additional layers may be present on the material prior to application of the film of the disclosure. These additional layers may be moisture-vapor permeable tie or base coats and intermediate layers. Thus, multi-layer films, and materials coated with multiple film layers (and/or coated layers), are provided. Typically, the film layer comprising the polymer of the disclosure is provided as the innermost layer.

Combinations of one or more inner layers comprising a coating according to the present disclosure with conventional, less hydrophobic layers may be anisotropic, and may show a directional effect of moisture-vapor flow on the water vapor resistance. This effect is most obvious in bi- and multilayer systems, and the magnitude of the effect is significant in the context of the overall breathability of the materials. Synergy may be observed when the vapor flow occurs first through the film in accordance with the present disclosure, which results in lower than expected water vapor resistance values for the composite. Conversely, vapor flow that occurs first through a less hydrophobic layer may have an undermining effect on the layer comprising a coating according to the present disclosure, which results in higher than expected water vapor resistance values. This additional control feature for moisture-vapor flow may be usefully incorporated into the design of multilayer films, other materials such as coated fabrics and end products such as garments.

5. PROPERTIES OF THE FUNCTIONALIZED BLOCK COPOLYMERS

An important feature of membranes comprising the functionalized block copolymer is that such membranes transport anions selectively. In this regard, the membranes disclosed herein complement membranes which comprise sulfonated block copolymers such as, e.g., described in U.S. Pat. No. 7,737,224, which transport cations.

In applications involving both anion- and cation-exchange membranes in combination it is important that the different membranes are similar in properties such as dimensional stability, strength, flexibility, and the like. The membranes disclosed herein have been found to have the necessary similarity to the cation-selective membranes comprising sulfonated block copolymers such as, e.g., described in U.S. Pat. No. 7,737,224.

The hardness and flexibility of the membrane can be easily adjusted by balancing the styrene content of the A and D blocks with the amount of amount of one or more soft B block(s). As the amount of styrene is increased, the functionalized block copolymer will become harder and less flexible. On the other hand, as the amount of block(s) B is increased, the functionalized block copolymer will become more malleable and flexible.

By adjusting the structure of the functionalized block copolymer, it is possible to produce membranes having surprising wet strength, well controlled and high rates of water and/or anion transport across the membrane, exceptional barrier properties for organic and non-polar liquids and gases, tunable flexibility and elasticity, controlled modulus, and oxidative and thermal stability. It is expected that the membranes would have good resistance to methanol transport and good retention of properties in the presence of methanol.

As these membranes are not cross-linked, they can be reshaped or reprocessed by re-dissolving them in solvent and recasting the resulting solution; they may be reused or reshaped using various polymer melt processes, also.

The functionalized block copolymers according to the present disclosure have a wet tensile strength greater than 100 psi, preferably greater than 500 psi, according to ASTM D412, and a swellability of less than 100% by weight.

The functionalized block copolymers of the present invention typically have wet tensile strengths above 500 psi, and in many cases about 1000 psi. Further, it has been shown that functionalized block copolymers of the present invention have a ratio of wet tensile strength to dry tensile strength greater than 0.3.

6. APPLICATIONS OF THE FUNCTIONALIZED BLOCK COPOLYMERS

The functionalized block copolymers may be compounded with other components not adversely affecting the copolymer properties. The functionalized block copolymers may be blended with a large variety of other polymers, including olefin polymers, styrene polymers, hydrophilic polymers and engineering thermoplastic resins, with polymer liquids and other fluids such as ionic liquids, natural oils, fragrances, and with fillers such as nanoclays, carbon, carbon black, carbon nanotubes, fullerenes, and traditional fillers such as talcs, silica and the like.

Additionally, the functionalized block copolymers may be blended with conventional styrene/diene and hydrogenated styrene/diene block copolymers, such as the styrene block copolymers available from Kraton Polymers LLC. Illustrative styrene block copolymers include linear S-B-S, S-I-S, S-EB-S, S-EP-S block copolymers. Also included are radial block copolymers based on styrene along with isoprene and/or butadiene and selectively hydrogenated radial block copolymers. Particularly useful are blends with the precursor block copolymer, or a non-functionalized, non-halogenated block copolymer corresponding to the functionalized block copolymer.

Olefin polymers include, for example, ethylene homopolymers, ethylene/alpha-olefin copolymers, propylene homopolymers, propylene/alpha-olefin copolymers, high impact polypropylene, butylene homopolymers, butylene/alpha-olefin copolymers, and other alpha-olefin copolymers or interpolymers. Representative polyolefins include, for example, but are not limited to, substantially linear ethylene polymers, homogeneously branched linear ethylene polymers, heterogeneously branched linear ethylene polymers, including linear low density polyethylene (LLDPE), ultra or very low density polyethylene (ULDPE or VLDPE), medium density polyethylene (MDPE), high density polyethylene (HDPE) and high pressure low density polyethylene (LDPE). Other polymers included hereunder are ethylene/acrylic acid (EAA) copolymers, ethylene/methacrylic acid (EMAA) ionomers, ethylene/vinyl acetate (EVA) copolymers, ethylene/vinyl alcohol (EVOH) copolymers, ethylene/cyclic olefin copolymers, polypropylene homopolymers and copolymers, propylene/styrene copolymers, ethylene/propylene copolymers, polybutylene, ethylene carbon monoxide interpolymers (for example, ethylene/carbon monoxide (ECO) copolymer, ethylene/acrylic acid/carbon monoxide terpolymer and the like). Still other polymers included hereunder are polyvinyl chloride (PVC) and blends of PVC with other materials.

Styrene polymers include, for example, crystal polystyrene, high impact polystyrene, medium impact polystyrene, styrene/acrylonitrile copolymers, styrene/acrylonitrile/butadiene (ABS) polymers, syndiotactic polystyrene, sulfonated polystyrene, sulfonated styrene block copolymers, and styrene/olefin copolymers. Representative styrene/olefin copolymers are substantially random ethylene/styrene copolymers, preferably containing at least 20, more preferably equal to or greater than 25%-wt. copolymerized styrene monomer. Correspondingly, representative sulfonated styrene block copolymers preferably containing at least 20, more preferably equal to or greater than 25%-wt. block copolymerized styrene monomer. The degree of sulfonated of sulfonated polystyrene and sulfonated styrene block copolymers may range from one sulfonate group per polymer chain to one sulfonate group per styrene polymer unit.

Hydrophilic polymers include polymeric bases which are characterized as having an available pair of electrons for interaction with acids. Examples of such bases include polymeric amines such as polyethyleneamine, polyvinyl amine, polyallylamine, polyvinylpyridene, and the like; polymeric analogs of nitrogen containing materials such as polyacrylamide, polyacrylonitrile, nylons, ABS, polyurethanes and the like; polymeric analogs of oxygen containing compounds such as polymeric ethers, esters, and alcohols; and acid-base hydrogen bonding interactions when combined with glycols such as polyethylene glycol, and polypropylene glycol, and the like, polytetrahydrofuran, esters (including polyethylene terephthalate, polybutyleneterephthalate, aliphatic polyesters, and the like), and alcohols (including polyvinyl alcohol), poly saccharides, and starches. Other hydrophilic polymers that may be utilized include sulfonated polystyrene.

Hydrophilic liquids such as ionic liquids may be combined with the polymers of the present invention to form swollen conductive films or gels. Ionic liquids such as those described in U.S. Pat. No. 5,827,602 and U.S. Pat. No. 6,531,241 may be introduced into the functionalized block copolymers either by swelling a previously cast membrane, or by adding to the solvent system before casting a membrane, coating a film or forming a fiber.

Illustrative materials that may be used as additional components include, without limitation: (1) pigments, antioxidants, stabilizers, surfactants, waxes, and flow promoters; (2) particulates, fillers and oils; and (3) solvents and other materials added to enhance processability and handling of the composition.

Pigments, antioxidants, stabilizers, surfactants, waxes and flow promoters, when utilized in combination with the functionalized block copolymers may be included in amounts up to and including 10% wt., i.e., from 0 to 10%, based on the total weight of the composition. When anyone or more of these components are present, they may be present in an amount from about 0.001 to about 5% wt., and more preferably from about 0.001 to about 1% wt.

Particulates, fillers and oils may be present in an amount up to and including 50%-wt., from 0 to 50% based on the total weight of the composition. When anyone or more of these components are present, they may be present in an amount from about 5 to about 50% wt., preferably from about 7 to about 50% wt.

It will be understood by those having ordinary skill in the art that the amount of solvents and other materials added to enhance processability and handling of the composition will in many cases depend upon the particular composition formulated as well as the solvent and/or other material added. Typically such amount will not exceed 50%, based on the total weight of the composition.

The functionalized block copolymers described herein can be employed in a variety of applications and end uses, and their property profile renders them particularly suited as materials in applications which require high modulus when immersed in water, good wet strength, good dimensional stability, good water and ion transport characteristics, good methanol resistance, easy film or membrane formation, good barrier properties, controlled flexibility and elasticity, adjustable hardness, and thermal/oxidative stability.

In one embodiment of the present invention, the functionalized block copolymers may be used in electrochemical applications, such as in fuel cells or redox flow cells (separator phase), anion exchange membranes for fuel cells and redox flow cells, dispersions of metal impregnated carbon particles in polymer cement for use in electrode assemblies, including those for fuel cells, water electrolyzers (electrolyte), acid batteries (electrolyte separator), super capacitors (electrolyte), separation cell (electrolyte barrier) for metal recovery processes, sensors (particularly for sensing humidity) and the like. The functionalized block copolymers are also used as pervaporation or desalination membranes, and in coatings on porous membranes. Their selectivity in transporting gases makes them useful for gas separation applications. Additionally, the functionalized block copolymers may be used in protective clothing and breathable fabric applications where the membranes, coated fabrics, and fabric laminates could provide a barrier of protection from various environmental elements (wind, rain, snow, chemical agents, biological agents) while offering a level of comfort as a result of their ability to rapidly transfer water from one side of the membrane or fabric to the other, e.g., allowing moisture from perspiration to escape from the surface of the skin of the wearer to the outside of the membrane or fabric and vice versa. Full enclosure suits made from such membranes and fabrics may protect first responders at the scene of an emergency where exposure to smoke, a chemical spill, or various chemical or biological agents are a possibility. Similar needs arise in medical applications, particularly surgery, where exposure to biological hazards is a risk. Surgical gloves and drapes fabricated from these types of membranes are other applications that could be useful in a medical environment. Articles fabricated from these types of membranes could have antibacterial and/or antiviral and/or antimicrobial properties as reported by Vinodh et al., J. Biosci. Tech., 1(1), 45-51 (2009), who disclose that quaternized S-EB-S block copolymers have antimicrobial activity. In personal hygiene applications, a membrane or fabric of the present invention that would transport water vapor from perspiration while providing a barrier to the escape of other bodily fluids and still retain its strength properties in the wet environment would be advantageous. The use of these types of materials in diapers and adult incontinence constructions would be improvements over existing technologies.

Accordingly, in some embodiments, the functionalized block copolymers described herein are particularly employed as materials for water vapor transporting membranes which are employed in wet or aqueous environments. Such membranes are, for example useful in fuel cells, filtration devices, devices for controlling humidity, devices for forward electro-dialysis, devices for reverse electro-dialysis, devices for pressure retarded osmosis, devices for forward osmosis, devices for reverse osmosis, devices for selectively adding water, devices for selectively removing water, devices for capacitive deionization, devices for molecular filtration, devices for removing salt from water, devices for treating produced water from hydraulic fracturing applications, devices for ion transport applications, devices for softening water, and batteries.

In some embodiments, the functionalized block copolymers are particularly advantageously employed in a membrane for an electro-deionization assembly which comprises at least one anode, at least one cathode, and one or more membranes. Electro-deionization assemblies include, in particular, desalination cells. An illustrative representation of a desalination cell is set forth in FIG. 4.

To be useful in an electrically driven desalination application, a membrane which transports cations is needed to transport ions that are attracted to the negatively charged electrode. This membrane must reject anions (cationic membrane). Each cell also needs a membrane which transports anions in the direction of the positively charged electrode (anionic membrane). It is important that the anionic membrane does not transport cations; a high level of selectivity for anions is important for the efficient use of electricity in these devices. In addition to being well matched to the cationic membrane in electrical properties, the anionic membrane also must be similar to the cationic membrane in mechanical properties, as well.

In some embodiments, the membranes comprising the functionalized block copolymer are particularly suited as anionic membranes. In particular applications the anionic membranes comprising the functionalized block copolymer may advantageously be paired with at least one cationic membrane.

Particular cationic membranes which are suited to be paired with the anionic membranes comprising the functionalized block copolymer are cation-exchange membranes which comprises a sulfonated block copolymer comprising at least two polymer end blocks E and at least one polymer interior block F, wherein each E block contains essentially no sulfonic acid or sulfonated ester functional groups and each F block comprises sulfonation susceptible polymer units and, based on the number of the sulfonation susceptible polymer units, from about 10 to about 100 mol % of sulfonic acid or sulfonate ester functional groups. Such cation-exchange membranes preferably comprise a sulfonated block copolymer as in general and in particular described in U.S. Pat. No. 7,737,224.

7. EXAMPLES

The following examples are intended to be illustrative only, and are not intended to be, nor should they be construed as, limiting the scope of the present invention in any way.

a. Materials and Methods

The tensile modulus in the dry state as described herein was measured according to ASTM D412.

The tensile modulus in the wet state as described herein was measured similar to the method according ASTM D412 using samples that had been equilibrated under water for a period of 24 hours prior to testing, and that were fully submerged under water for testing.

All tensile data were collected in a climate controlled room at 74° F. (23.3° C.) and 50% relative humidity.

The WVTR as described herein was measured similar to ASTM E 96/E96M. The ASTM method was modified by using a smaller vial, employing 10 ml of water, and having an area of exposed membrane of 160 mm$^2$ (as opposed to 1000 mm$^2$ according to the ASTM method). After adding the water and sealing the vial with the membrane test specie, the vial was inverted, and air having a temperature of 25° C. and a relative humidity of 50% was blown across the membrane. Weight loss was measured versus time, and the water transport rate was calculated on the basis of the measurements as g/m$^2$, or as g×mil/m$^2$ when normalized for thickness of the tested membrane.

The degree of sulfonation as described herein and as determined by titration was measured by the following potentiometric titration procedure. The non-neutralized sulfonation reaction product solution was analyzed by two separate titrations (the "two-titration method") to determine the levels of styrenic polymer sulfonic acid, sulfuric acid, and non-polymeric byproduct sulfonic acid (2-sulfoisobutyric acid). For each titration, an aliquot of about five (5) grams of the reaction product solution was dissolved in about 100 mL of tetrahydrofuran and about 2 mL of water and about 2 mL of methanol were added. In the first titration, the solution was titrated potentiometrically with 0.1 N cyclohexylamine in methanol to afford two endpoints; the first endpoint corresponded to all sulfonic acid groups in the sample plus the first acidic proton of sulfuric acid, and the second endpoint corresponded to the second acidic proton of sulfuric acid. In the second titration, the solution was titrated potentiometrically with 0.14 N sodium hydroxide in about 3.5:1 methanol:water to afford three endpoints: The first endpoint corresponded to all sulfonic acid groups in the sample plus the first and second acidic proton of sulfuric acid; the second endpoint corresponded to the carboxylic acid of 2-sulfoisobutyric acid; and the third endpoint corresponded to iso-butyric acid.

The selective detection the of the second acidic proton of sulfuric acid in the first titration, together with the selective detection of the carboxylic acid of 2-sulfoisobutyric acid in the second titration, allowed for the calculation of acid component concentrations.

The degree of sulfonation as described herein and as determined by $^1$H-NMR was measured using the following procedure. About two (2) grams of non-neutralized sulfonated polymer product solution was treated with several drops of methanol and the solvent was stripped off by drying in a 50° C. vacuum oven for approximately 0.5 hours. A 30 mg sample of the dried polymer was dissolved in about 0.75 mL of tetrahydrofuran-d8 (THF-d8), to which was then added with a partial drop of concentrated $H_2SO_4$ to shift interfering labile proton signals downfield away from aromatic proton signals in subsequent NMR analysis. The resulting solution was analyzed by $^1$H-NMR at about 60° C. The percentage styrene sulfonation was calculated from the integration of $^1$H-NMR signal at about 7.6 part per million (ppm), which corresponded to one-half of the aromatic protons on sulfonated styrene units; the signals corresponding to the other half of such aromatic protons were overlapped with the signals corresponding to non-sulfonated styrene aromatic protons and tert-butyl styrene aromatic protons.

The ion exchange capacity as described herein for sulfonated block copolymers was determined by the potentiometric titration method described above and was reported as milliequivalents (meq.) of sulfonic acid functionality per gram of sulfonated block copolymer.

The degree of functionalization as described herein can be determined by $^1$H-NMR or IR spectroscopy The ion exchange capacity in meq. per gram polymer as described herein for the functionalized block copolymers can be calculated based on the degree of functionalization divided by the number average molecular weight of the functionalized block copolymer.

The area resistance can be determined by direct current (DC) measurements or by alternating current (AC) measurements. Resistance measured by DC is typically higher than resistance measured by AC, because resistance measured by DC includes boundary layer effects. Since boundary layer effects always exist in praxis, resistance data from DC method more closely represent the praxis performance.

Figure 2:
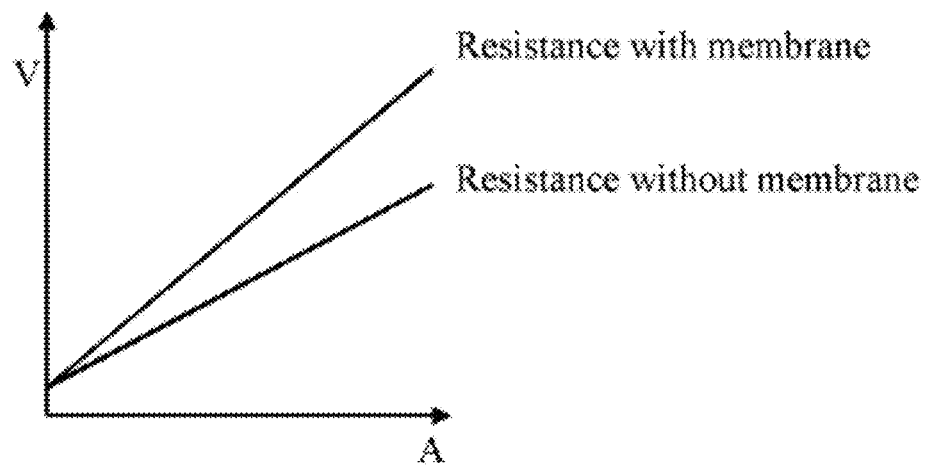
FIG. 2 illustrates how to determine membrane resistance from measurements taken in a set-up according to FIG. 1.

The membrane resistance was measured by a direct current method using a set-up as illustrated in FIG. 1. The potential drop between the Haber-Luggin capillaries was measured with and without the membrane as a function of the current density. The resistance was determined from the slope of voltage vs. current. To obtain the membrane resistance, the resistance without the membrane was subtracted from the resistance with the membrane. FIG. 2 illustrates how to obtain membrane resistance. Membrane resistance is the difference in the slopes.

Membrane area resistance is dependent on thickness. Therefore, area resistance of membranes which differ in thickness cannot be compared. To obtain true membrane properties, membrane conductivity is often used. Membrane conductivity was calculated by dividing the membrane thickness by membrane area resistance.

"True" membrane permselectivity should be based on the measurement of ion concentration changes of both concentrate and dilute solutions by measuring the amount of current passing through the electro-dialysis system. But this method is time consuming.

Figure 3:
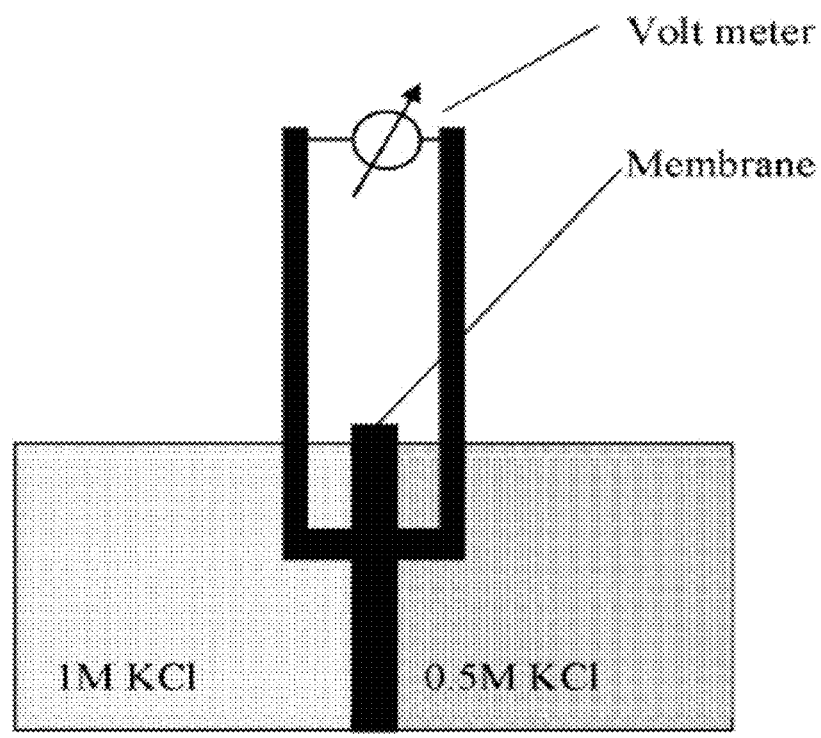
FIG. 3 schematically illustrates the experiment set-up for measuring the permselectivity.

An alternative method is measuring "apparent" permselectivity, which is based on the measurement of the potential gradient across a membrane separating two electrolyte solutions of different concentrations. It is worthy to point out that the apparent permselectivity is always larger than the real permselectivity because it does not take boundary layer effects into account. However, the difference is generally small. The experiment set-up is schematically shown in FIG. 3.

The potential between two electrolyte solutions of different concentrations, i.e., membrane potential ($\varphi_m$) was measured using a voltmeter. Membrane potential ($\varphi_m$) can be expressed by the following equation:

$$\varphi_m = (2T_{cou} - 1)\frac{RT}{F}\text{Ln}\frac{a1}{a2}$$

where $T_{cou}$ is the membrane transport number of the counterions, a1 and a2 are the activity of the two KCl solutions, R is the gas constant, and T is the temperature, and F is the Faraday constant. For a strictly permselective membrane (where $T_{cou}$ is 1), membrane potential is the following:

$$\varphi_{m,sp} = \frac{RT}{F}\text{Ln}\frac{a1}{a2}$$

The apparent permselectivity of a membrane ($\Psi$), when measured in KCl solutions, is given by the following equation:

$$\Psi = \frac{\varphi_m}{\varphi_{m,sp}}$$

In the example above, one side of the membrane is 0.1M KCl, the other side of the membrane is 0.5M KCl, and $\varphi_{m,sp}$ is 36.2 mV. Therefore, the apparent permselectivity of a membrane can be calculated according to following equation:

$$\Psi = \frac{\text{Measured } \varphi_m \text{ in mV}}{36.2 \text{ mV}}$$

Of course, other solutions and concentrations can be used too. But corrections need to be made for different concentrations as well as for difference in ion mobility in solutions.

Figure 4:
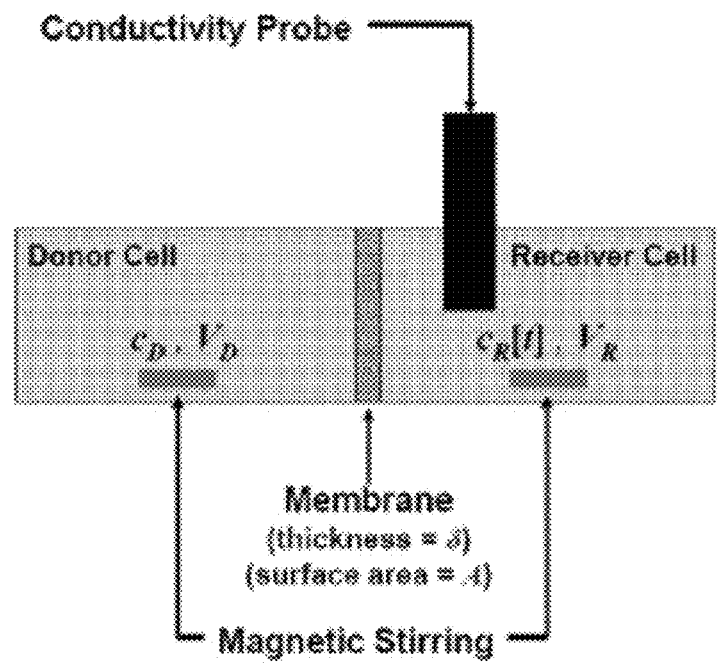
FIG. 4 schematically illustrates the experiment set-up for measuring the permeability.

The experimental set-up for measuring salt permeability is shown in the FIG. 4. The membrane was sandwiched between two cells: donor cell and receiving cell. The donor cell contained a salt solution with known concentration, and the receiving cell contained pure water at the start of the experiment. As salt permeated through the membrane from the donor cell to the receiving cell, the salt concentration in the receiving cell increased, and it was monitored by a conductivity probe over the time.

Salt permeability can be deducted from following equation, where $P_s$ is the salt permeability, t is the time, $V_R$ is the volume of the cells, $\delta$ is the membrane thickness, A is the membrane surface area, $c_D[0]$ is the starting salt concentration in the donor cell, and $c_R[t]$ is the salt concentration over the testing time in the receiving cell.

$$\ln\left[1-\frac{2c_R[t]}{c_D[0]}\right]\left(-\frac{V_R\delta}{2A}\right)=P_s t$$

For some membranes, $P_s$ is dependent on the starting salt concentration ($c_D[0]$), therefore, $c_D[0]$ is often reported along with $P_s$. In the tests reported herein, $c_D[0]$ was 2000 ppm NaCl.

The following solvents and chemicals used in the experiments and investigations described hereinafter were obtained from Sigma-Aldrich: Cyclohexane (#227048), heptane (#246654), toluene (#244511), 1-propanol (#402893), tetrahydrofuran (THF; #186562), acetic acid (99.7%; #320099), N,N-dimethylacetamide (DMAc; #271012), methylethylketone (MEK; #360473), N,N-dimethylformamide (DMF; #227056), acetonitrile (#271004), 1,4-diazabicyclo[2.2.2]octane (DABCO; #D27802), 25%-wt. trimethylamine solution (#W324108), sodium tetrafluoroborate ($NaBF_4$; #202215), p-toluenesulfonic acid monohydrate (#402885), and xylenes (#214736). Acetone was obtained from VWR (#BDH2025).

Unless indicated otherwise, the solvent ratios indicated for solvent systems in the following are vol./vol. ratios.

b. Preparation Examples

Example 1: Preparation of a Selectively Halogenated Block Copolymer (P1.II)

The starting material was a block copolymer (P1.III) having the general configuration $A^1$-$B^1$-$D^{o1}$-$B^2$-$A^2$ wherein each of $A^1$ and $A^2$ was a block of polymerized tert-butylstyrene (tBS) having an estimated true molecular weight based upon Gel Permeation results for styrene-equivalent molecular weight of about 11,000 g/mol, $B^1$ and $B^2$ were blocks of hydrogenated isoprene (EP) having an estimated true molecular weight of about 13,500 g/mol and about 13,800 g/mol, respectively, and $D^{o1}$ was a block of para-methylstyrene (pMS) which had an estimated true molecular weight of about 21,000 g/mol.

The block copolymer P1.III was dissolved in tetrachloromethane ($CCl_4$) to obtain a solution having a concentration of 1.2 g P1.III per 100 ml $CCl_4$. The solution was heated to 70° C. in an oxygen free atmosphere while stirring. N-bromosuccinimide (NBS; 1.8 mol per mol of pMS polymer units) and azobisisobutyro nitrile (AIBN; 0.09 mol per mol of pMS polymer units) were added to the heated solution and the resulting mixture was stirred and heated under reflux for about 1.5 hours. A second addition of NBS and AIBN in the same amounts was made followed by heating under reflux for an additional 3 hours. The brominated polymer (P1.II) was precipitated by firstly distilling off approximately 50% of the $CCl_4$, and subsequently adding a ten-fold excess (by volume) of methanol. The precipitate was recovered by vacuum filtration and was purified by washing with two equal volumes of methanol. As determined by $^1$H-NMR, the degree of bromination of the brominated polymer (P1.II) was 70%.

Example 2: Preparation of a Selectively Halogenated Block Copolymer (P2.II)

The block copolymer P1.III of Example 1 was dissolved in $CCl_4$ to obtain a solution having a concentration of 1.4 g P1.III per 100 ml $CCl_4$. The solution was stirred and heated to 70° C. in a nitrogen atmosphere. At 70° C., NBS (1.0 mol per mol of pMS polymer units) and AIBN (0.05 mol per mol of pMS polymer units) were added and the resulting mixture was stirred and heated under reflux for 4 hours. The brominated polymer (P2.II) was precipitated and recovered in the manner described in Example 1. As determined by $^1$H-NMR, the degree of bromination of the brominated polymer (P2.II) was 56.9%.

Example 2B: Preparation of a Selectively Halogenated Block Copolymer (P6.II)

The procedure outlined above was repeated using an alternate block copolymer as the starting material and the bromination reaction conditions were adjusted to use various alternative solvents and solvents blends as well as different starting polymer concentrations. For these experiments, the starting material was a block copolymer (P6.III) having the general configuration $A^1$-$B^1$-$D^{o1}$-$B^2$-$A^2$ wherein $A^1$ was a block of polymerized tert-butylstyrene having an estimated true molecular weight of 15,000 g/mol and $A^2$ was a block of polymerized tert-butylstyrene (tBS) having an estimated true molecular molecular weight of about 18,000 g/mol, $B^1$ and $B^2$ were blocks of hydrogenated isoprene (EP) having an estimated true molecular weight of about 13,000, and $D^{o1}$ was a block of para-methylstyrene (pMS) which had an estimated true molecular weight of about 16,000.

In a representative experiment, 15.1 g of base block copolymer P6.III was dissolved in 400 ml of chlorobenzene in a 1 liter round bottom flask fitted with a mechanical stirrer. A stream of nitrogen was purged through the stirred reaction mixture to remove oxygen. The well stirred reaction vessel was heated to 70° C. The brominating agent (2.4 g of NBS) was added to the reaction vessel with stirring. When the brominating agent had dissolved, the promoter (0.12 g of AIBN) was added to the well stirred vessel and the reactor contents were maintained at 70° C. After 63 minutes of reaction, a second aliquot of NBS (2.4 g) was added to the vessel. When the NBS had dissolved, an additional aliquot of AIBN (0.12 g) was added, as well. After 123 minutes of reaction time, a third aliquot of NBS (2.4 g) was added to the vessel. When the NBS had dissolved, an additional aliquot of AIBN (0.12 g) was added, as well. After 183 minutes of reaction, a fourth aliquot of NBS (2.4 g) was added to the vessel. When the NBS had dissolved, an additional aliquot of AIBN (0.12 g) was added, as well. After 244 minutes of reaction, a fifth aliquot of NBS (2.4 g) was added to the vessel. When the NBS had dissolved, an additional aliquot of AIBN (0.12 g) was added, as well. After 307 minutes of reaction, a sixth and final aliquot of NBS (2.4 g) was added to the vessel. When the NBS had dissolved, an additional aliquot of AIBN (0.12 g) was added, as well. After a total reaction time of 357 minutes at 70° C., the solution was allowed to cool to room temperature. The reaction product was recovered as a solid by coagulation in an excess of alcohol. The solid was collected by filtration, dried, and weighed (18 g of brominated polymer product). The isolated yield of brominated polymer product P.6.II(b) (see table below for polymer product designation), was over 95 wt %. Analysis by Fourier Transform Infrared Analysis, FTIR, found that the product had been brominated. Quantitative analysis using a proton nuclear magnetic resonance technique, $^1$H-NMR, found that 74 mol % of the methyl sites in the p-methylstyrene segment of the block copolymer had been brominated.

Using the reaction technique outlined above, P6.III was brominated in various solvents and at varying starting polymer concentrations. For these experiments the wt ratio of brominating agent and promoter to polymer P6.III was held essentially constant. The results of these experiments are summarized in the table below.

As determined by $^1$H-NMR, the degree of bromination of the brominated polymers P6.II(a) through (h) is shown in Table 1:

TABLE 1

|  | Bromination Solvent | Wt % Polymer | H-NMR Conversion (% mol) |
| --- | --- | --- | --- |
| P6.II(a) | CCl4 | 1 | 72 |
| P6.II(b) | Chlorobenzene | 3 | 74 |
| P6.II(c) | Chlorobenzene | 5 | 62 |
| P6.II(d) | Chlorobenzene | 8 | 63 |
| P6.II(e) | Cyclohexane:ChloroBenzene 1:1 | 5 | 77 |
| P6.II(f) | Cyclohexane | 5 | 72 |
| P6.II(g) | Cement diluted with Chlorobenzene (Cyclohexane:Chlorobenzene 1:2) | 5 | 66 |
| P6.II(h) | Cement diluted with Cyclohexane | 5 | 62 |

*Cement is a 15 wt % solution of P6.III in cyclohexane.

As reflected by the data in this table, non-halogenated solvents can be used effectively for the bromination reaction. This is advantageous as non-halogenated solvents are preferred for environmental reasons. In addition, the concentration of polymer used in the bromination reaction can be increased without adversely affecting to outcome of the bromination chemistry. This outcome is important as the cost of manufacturing the brominated polymer can be expected to be inversely related to the concentration of polymer in the reaction medium.

Example 2C: Preparation of a Selectively Halogenated Block Copolymer (P7.II)

The same bromination process for brominating block polymer P6.III to produce P6.II(a) was employed, including the same solvent (CCl4), concentration (1 wt %), and bromination level except that the process was scaled up from a laboratory sized process to a larger process, utilizing 100 g polymer, and resulting in the block copolymer P7.II.

Example 3: Preparation and Investigation of Trimethylamine Functionalized Block Copolymer (P1.I)

A 28% wt. solution of the selectively brominated block copolymer P1.II of Example 1 in toluene was hand-cast onto a siliconized substrate at room temperature. After drying under nitrogen purge, a membrane of a thickness in the range of 3-5 mil was obtained. The membrane was cut into several pieces, and the pieces were placed into a glass sample jar. About 180 mL of a 25% wt. trimethylamine solution in water was added to the sample jar containing the membrane pieces, submerging the membrane pieces in the solution. The sample jar was sealed and put into an oven at 60° C. for roughly 6 hours and subsequently was allowed to cool to room temperature (~25° C.). After about 2 days at room temperature, the membrane pieces were washed three times with deionized (DI) water. A day later, the pH of the solution after the washes was basic (pH=8.5-9.0) and the membrane pieces were washed an additional two times to obtain a neutral pH. A part of the membrane pieces were tested for transport performance while other pieces were used in dissolution studies.

The tested membrane potential was found to be 15.5 mV with a calculated permselectivity of 43.7% and an NaCl permeability of $1.5 \times 10^{-6}$ cm$^2$/s.

Some pieces of membrane were air dried at ambient conditions and put into the following solvents and solvent systems separately for dissolution studies: (a) toluene, (b) 1-propanol, (c) tetrahydrofuran (THF), (d) acetic acid (99.7%), (e) acetic acid (roughly 80%) in water, (f) toluene/1-propanol (1/1), (g) toluene/N,N-dimethylacetamide (DMAc) (3/1), (h) toluene/DMAc (1/1), (i) acetone, (j) acetone/water (1/1), (k) xylenes, (l) toluene/1-propanol (4/1), (m) toluene/DMAc (7/3), (n) cyclohexane, (o) methylethylketone (MEK), (p) N,N-dimethylformamide (DMF), (q) toluene/DMF (1/1), and (r) acetonitrile. No dissolution of the membrane pieces was observed in any one of the solvents and solvent systems.

The investigations showed that the trimethylamine functionalized block copolymer P1.I surprisingly had unique properties when tested for membrane transport performance and further possessed a significant chemical resistance to several of the chemicals tested.

Example 3B: Preparation and Investigation of Trimethylamine Functionalized Block Copolymer (P6.I)

The brominated derivatives of P6.II(a)-(h) were functionalized according to the following procedure. The polymer was dissolved in toluene at 28 wt % solids and placed on a roller for 2-4 hours until the polymer was fully dissolved. A film was casted from the solution with an adjustable blade set at 50 micrometer for a thick, evenly casted film. The film was cut into 3"×3" pieces and placed in a jar of 25 wt % TMA in H$_2$O overnight. The process was conducted in a dry box. The film was then removed from the solution and patted dry with absorbent wipes and allowed to dry overnight inside the dry box. Once dried, the films were ready for permeability, permselectivity, water uptake and mechanical strength testing. The results of these experiments are summarized in the following tables 2 and 3:

TABLE 2

|  | Casting Solvent | Permeability (cm$^2$/sec) | Permselectivity (%) |
| --- | --- | --- | --- |
| P6.I(a) | Toluene | 1.01E−07 | 82 |
| P6.I(b) | Toluene | 8.99E−08 | 83 |
| P6.I(c) | Toluene | 9.63E−08 | 74 |
| P6.I(d) | Toluene | 6.87E−07 | 53 |

TABLE 2-continued

| | Casting Solvent | Permeability (cm²/sec) | Permselectivity (%) |
|---|---|---|---|
| P6.I(e) | Toluene | 1.12E−07 | 81 |
| P6.I(f) | Toluene | 1.10E−07 | 79 |
| P6.I(g) | Toluene | 9.84E−08 | 82 |

TABLE 3

| | Casting Solvent | Strength Dry (psi) | Elongation Dry (%) | Strength Wet (psi) | Elongation Wet (%) | Water Uptake (%) |
|---|---|---|---|---|---|---|
| P6.I(a) | Toluene | NA | NA | NA | NA | NA |
| P6.I(b) | Toluene | 2200 | 47 | 680 | 210 | 95 |
| P6.I(c) | Toluene | 2000 | 65 | 500 | 120 | 83 |
| P6.I(d) | Toluene | 2200 | 53 | 420 | 130 | 96 |
| P6.I(e) | Toluene | 2600 | 77 | NA | NA | 87 |
| P6.I(f) | Toluene | 2400 | 28 | NA | NA | 73 |
| P6.I(g) | Toluene | 1900 | 24 | NA | NA | 64 |

*NA = Not Analyzed

Similarly as noted for P1.I, all of the trimethylamine functionalized block copolymers had surprisingly high capacities for transporting chloride anions as reflected in the permeability results. Tensile tests on selected polymers demonstrated that these materials were remarkably strong and tough, as well. As reflected in the water uptake values, these membranes had a high affinity for water.

Example 4: Preparation and Investigation of Trimethylamine Functionalized Block Copolymer (P2.I) and DABCO Functionalized Block Copolymer (P3.I)

A 5% wt. solution of the selectively brominated block copolymer P1.II of Example 1 in toluene was prepared (Solution 1).

A 25% wt. solution of 1,4-diazabicyclo[2.2.2]octane (DABCO) in water was prepared and was added to a first portion of Solution 1 at an equal weight ratio to obtain Sample 1. Correspondingly, a 25% wt. trimethylamine solution in water was added to a second portion of Solution 1 at an equal weight ratio to obtain Sample 2.

Samples 1 and 2 were put onto a low speed shaker at room temperature for 7 hours and then allowed to sit for 8 days. In each case the solutions phase-separated into distinct layers. Sample 1 containing 1,4-diazabicyclo[2,2,2]octane, DABCO, separated into two layers, while Sample 2 containing trimethylamine separated into three layers; however, the top layer of Sample 2 did not contain enough liquid or separation to isolate.

Drop castings were then made by pipetting each layer onto clear microscope glass slides and allowing the samples to dry at ambient conditions within a fume hood. After two days, the glass slides with drop castings were put into a vacuum oven at 50° C. for roughly 5 hours for further drying. All of the slides were then separately soaked in deionized (DI) water for 5 days to expel residual amine and subsequently re-dried in a vacuum oven at 50° C. for roughly 8 hours.

The drop cast films on glass slides were separately soaked in the following solvents and solvent systems at room temperature overnight: (a) 1-propanol, (b) toluene, (c) cyclohexane, (d) toluene/1-propanol (1/1), (e) toluene/N,N-dimethylacetamide (DMAc) (3/1), and (f) tetrahydrofuran (THF).

Two drop cast films of Sample 2 containing TMA dissolved in solvent system (d) toluene/1-propanol (1/1). None of the other drop castings dissolved in any of the above solvent systems.

Drop cast films were successfully made from solutions containing polymer, toluene, and the respective amine solutions with two of the drop cast films being re-dissolvable. The investigations illustrate that the selectively halogenated block copolymer can be converted into the functionalized block copolymer in solution prior to film casting. The investigations also showed, again, the surprising chemical resistance of membranes cast from the functionalized block copolymers to various solvents and solvent systems.

As the DABCO reagent contains 2 amine centers of equal reactivity (they are structurally identical), it is reasonable to expect that the film from the reaction with this reagent is covalently crosslinked in the ion microphase. The displacement of bromide centers on adjacent polymer chains will result in the formation of 2 quaternary ammonium ion species linked by a single DABCO center; in this way, the polymer chains will be covalently crosslinked.

Example 5: Preparation and Investigation of DABCO Functionalized Block Copolymer (P4.I)

The selectively brominated block copolymer P1.II of Example 1 was cast into a membrane, and the membrane was cut into pieces and dried, as described in Example 3. The membrane pieces were submerged in a 25% wt. solution of DABCO in water at room temperature. The sample was allowed to sit at room temperature for 3 days with 7 hours of low speed shaking on the first day. Thereafter, the membrane pieces were washed four times with deionized (DI) water, and then allowed to soak in DI water over a weekend. The soaked membrane pieces were then dried in a vacuum oven at 50° C. for roughly 5 hours.

Pieces of the dried membrane were put into (a) toluene/1-propanol (1/1) and (b) acetonitrile. No dissolution was observed; this result is expected for a crosslinked polymer system. Another piece of the dried membrane was put into a second batch of toluene/1-propanol (1/1) and again did not dissolve. Both samples containing the toluene/1-propanol solvent system (a) were put onto a high speed orbital shaker for roughly 6 hours with no dissolution. Such a crosslinked membrane will not dissolve if the crosslink density is sufficiently high. For some applications, such a crosslinked membrane is preferred for its resistance to solvents.

Example 6: Preparation and Investigation of Anion Modified Amine Functionalized Block Copolymers 25% wt. solution of $NaBF_4$ in water was prepared (Solution 1). Separately, a 25% wt. solution of p-toluenesulfonic acid monohydrate in water was prepared (Solution 2).

Subsequently, pieces of vacuum dried membranes similar to P1.I described in Example 3 and P4.1 described in Example 5 were immersed in separate portions of Solution 1 (Samples P1-1.I and Samples P4-1.I) and of Solution 2 (Samples P1-2.I and Samples P4-2.I).

The samples were maintained for about two days at room temperature. Then, the membrane pieces were separated from the solutions, washed five times with DI water and dried in a vacuum oven at 50° C. for roughly 5 hours.

Each of the dried membrane pieces was separately placed into the following solvents or solvent systems for dissolution studies: (a) cyclohexane, (b) toluene, and (c) toluene/1-propanol (1/1). No dissolution of the membrane pieces was observed in any one of the investigated solvents and solvent systems. Surprisingly, $NaBF_4$ and p-toluenesulfonic acid monohydrate yielded no effect on dissolution characteristics of the amine functionalized block copolymer with the listed solvents and solvent systems.

Example 7: Preparation of DABCO Functionalized Block Copolymer (P5.I) in Non-Aqueous Solvents The selectively brominated block copolymer P1.II of Example 1 was dissolved in toluene and used with a non-aqueous DABCO solution. It was found that solid DABCO readily dissolved in 1-propanol and stayed soluble when an equal amount of toluene (toluene/1-propanol was 1/1) was added to the solution.

A 10% wt. solution of the selectively brominated block copolymer P1.II of Example 1 in toluene was prepared (Solution 1). Separately, a 5% wt. solution of DABCO in 1-propanol was prepared (Solution 2), and was added to Solution 1 in equal amounts to obtain a final solvent ratio of 1/1. Upon addition of Solution 2 to Solution 1, an emulsion was immediately formed (Sample 1). Contrastingly, when 1-propanol was added to Solution 1 in equal amounts to obtain a final solvent ratio of 1/1, a precipitate like substance immediately formed.

Sample 1 was put into an oven at 50° C. for roughly 5 hours; no change in appearance was observed. In both cases, emulsions and precipitates were not the desired effect. Instead, a homogenous solution containing dissolved polymer in toluene/1-propanol with only residual amounts of amine were desired.

Example 8: Hypothetical Example

A membrane of the present invention is prepared from a polymer synthesized by anionic polymerization of a functional monomer.

Using anionic polymerization grade solvents, monomers and lithium alkyl initiators and using standard anionic polymerization techniques, 8 liters of cyclohexane is heated to 50° C. in a 10 liter, water cooled reactor is treated with 10 meq. of sec-butyl lithium (s-BuLi; 1 M solution in cyclohexane). About 150 g of styrene monomer, S, is added to afford a first polymer block of about 15,000 g/mol molecular weight (MW). Initiation of polymerization will be noted by a change in color of the solution to red-orange and a modest increase in the temperature of the polymerization solution. After completion of polymerization of the styrene monomer, about 100 g of isoprene, Ip, is added to afford a living two block copolymer having a total MW of about 25,000 g/mol. Polymerization of the isoprene will change the color of the solution to a slight yellow. When isoprene polymerization is complete, about 150 of the piperidylmethyl functionalized styrene monomer (pPMS; prepared by reacting p-chloromethylstyrene with piperidene) is added to afford a total three block copolymer of about 40,000 g/mol MW. The addition of the functionalized monomer will induce a change in the color of the living polymerization solution to a distinctly red color. When polymerization of the third block of the copolymer is complete, a coupling agent, 0.4 meq of tetramethoxysilane, is added to the polymerization solution and reaction is allowed to proceed at 50° C. for about 4 hours. Analysis of the polymer product by gel permeation chromatography will show that at least 80% of the polymer chains will have been coupled to afford a mixture of a linear, 5 block copolymer, $(S-Ip-pPMS)_2—Si(OMe)_2$, and related branched polymers, $(S-Ip-pPMS)_3—SiOMe$ and $(S-Ip-pPMS)_4—Si$. The incorporation of the functional monomer will be quantitatively assayed using a $^1$H-NMR technique.

The product solution will be cast onto a siliconized mylar surface. Evaporation of the volatile components of the solution will afford a thin, about 1 mil thick, uniform membrane. The membrane will be microphase separated having a phase containing the functional monomer component of the block copolymer and a separate phase containing the styrene and isoprene components of the block copolymer.

The membrane will be soaked overnight in an alcoholic solution of neo-pentyl bromide. The product membrane will contain a continuous quaternary ammonium ion containing phase formed by the reaction of the neo-pentyl bromide reagent with the tertiary amine substituents in the pPMS monomer portion of the block copolymer. This phase of the membrane will effectively transport water and negatively charged ions, like chloride. It will selectively reject the transport of positively charged ions, like $Na^+$. Thus, this phase will afford the membrane anionic exchange membrane performance.

The co-continuous ion free phase of the membrane will afford strength properties for the membrane. The membrane is expected to have over 1,000 psi tensile strength, when test wet or dry. In this way, a strong, effective anionic exchange membrane can be prepared by anionic polymerization of a functional monomer.

Example 9: Preparation of a Selectively Halogenated Block Copolymer

Similar to Example 1, a block polymer of same structure as P1.III in Example 1 was dissolved in 1.1 wt/vol % concentration in $CCl_4$ under nitrogen. At 70° C., NBS and AIBN were added at molar ratios of 0.67 and 0.034 to the pMS block of the polymer, respectively. This mixture was heated and stirred under reflux for 4 hours. The product was isolated by first evaporating about 66% of the $CCl_4$ followed by methanol precipitation with 10-20 fold excess and filtration. The degree of bromination was determined to be about 41.8% by $^1$H-NMR.

Example 10: Preparation of a Selectively Halogenated Block Copolymer

Similar to Example 1, a block polymer of same structure as P1.III in Example 1 was dissolved in 1.2 wt/vol % concentration in chlorobenzene under nitrogen. At 70° C., NBS and AIBN were added at molar ratios of 0.65 and 0.032 to the pMS block of the polymer, respectively. This mixture was heated and stirred under reflux for 4 hours. The product was isolated by first evaporating about 66% of the chlorobenzene, re-diluting the residue with an equal volume of tetrahydrofuran (THF), followed by methanol precipitation with 10-20 fold excess and filtration. The degree of bromination was determined to be about 41.8% by 1H-NMR.

Example 11: Preparation of a Selectively Halogenated Block Copolymer

Similar to Example 1, a block polymer of same structure as P1.III in Example 1 was dissolved in 2.3 wt/vol % concentration in chlorobenzene under nitrogen. At 70° C., NBS and AIBN were added at molar ratios of 0.67 and 0.034 to the pMS block of the polymer, respectively. This mixture was heated and stirred under reflux for 4 hours. The product was isolated by first evaporating about 66% of the chlorobenzene, re-diluting with an equal volume of THF, followed by methanol precipitation with 10-20 fold excess and filtration. The degree of bromination was determined to be about 36.0% by $^1$H-NMR.

Example 12: Preparation of a Selectively Halogenated Block Copolymer

Similar to Example 1, a block polymer of same structure as P1.III in Example 1 was dissolved in 1.3 wt/vol % concentration in chlorobenzene under nitrogen. At 70° C., an addition was made of NBS and AIBN at molar ratios of 0.33 and 0.033 to the pMS block of the polymer, respectively. This mixture was heated and stirred under reflux for 2 hours. A second addition of NBS and AIBN in the same amounts was made followed by refluxing for an additional 2 hours. This mixture was heated and stirred under reflux for 4 hours. The product was isolated by first evaporating about 66% of the chlorobenzene, re-diluting with an equal volume of THF, followed by methanol precipitation with 10-20 fold excess and filtration. The degree of bromination was determined to be 38.83% by $^1$H-NMR.

Example 13: Preparation and Investigation of Additional Tertiary Amine Variants of Functionalized Block Copolymer (P7.I) (Number for New Brominated Polymer Made by PC for Mike Heniff)

The selectively mid-block brominated polymer P7.II described above was dissolved in a toluene/alcohol solvent blend (blends were 1/1 (wt/wt) where EtOH was ethanol, n-PrOH was 1-propanol, and MeOH was methanol). These solutions were reacted independently with each of the following tertiary amines trimethylamine (TMA), N,N-dimethylbenzylamine (BDMA), N-methyldibenzylamine (DBMA), tribenzylamine (TBA), N-methylpiperidine (MPIP), and triethylamine (TEA). These moieties are shown as follows:

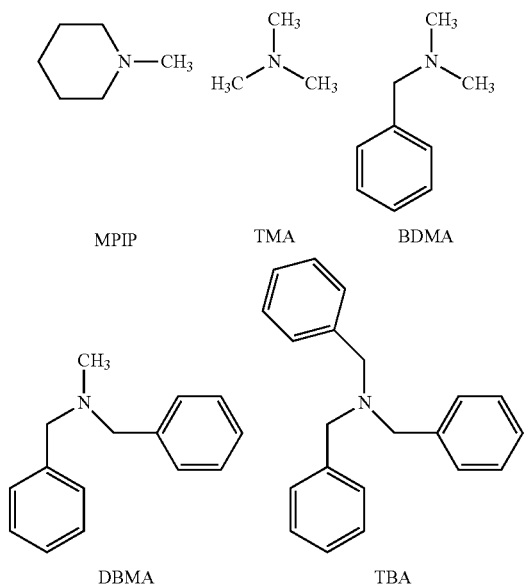

The results are shown in Table 4 as follows:

TABLE 4

| | Amine | Solvent | Conversion (mol %) | Permeability ($10^{-7}$ cm$^2$/sec) |
|---|---|---|---|---|
| P7.I(a) | TMA | Tol/EtOH | NA | 0.06 |
| P7.I(b) | TMA | Tol/n-PrOH | NA | 0.004 |
| P7.I(c) | BDMA | Tol/n-PrOH | NA | NA |
| P7.I(d) | DBMA | Tol/n-PrOH | 50 | NA |
| P7.I(e) | TBA | Tol/n-PrOH | 6 | NA |
| P7.I(f) | MPIP | Tol/MeOH | NA | 0.41 |
| P7.I(g) | TEA | Tol/MeOH | NA | 0.004 |

*NA = Not Analyzed

The various reaction products were cast into thin (1 to 3 mil) membranes and evaluated for the selective transport of chloride ions in aqueous solutions. These results demonstrate that the casting solvent and tertiary amine functionalizing agent structure affect the performance of the resulting membranes.

Example 14: Preparation of a Selectively Mid-Block Halogenated Block Copolymer Having Polystyrene End Segments (P8.II)

An alternate base polymer was prepared using a coupling technology. In this way a block copolymer (P8.III) having the general configuration $(A^1-B^1-D°)_x$ was prepared wherein $A^1$ was a block of polymerized styrene having a true molecular weight of about 15,000 g/mol, $B^1$ was a block of hydrogenated polymerized isoprene having a styrene-equivalent molecular weight of about 16,000 g/mol, $D^{o2}$ was a block of polymerized p-methylstyrene having a styrene equivalent molecular weight of about 16,000 g/mol and x was a residue of a silicone coupling agent (methyltrimethoxysilane) and had a numerical value between 2 and 3. It is noted that this polymer is structurally similar to the general configuration $A^1-B^1-D°^1-B^2-A^2$ outlined in Example 1 with the exception that the end segments on the polymer of this example are polymerized styrene whereas the end segments of the polymer of Example 1 were polymerized para-tert-butylstyrene.

The polystyrene end block copolymer was brominated using the AIBN/NBS technique described in Example 10. Sufficient dry polymer was dissolved in 8.05 liters of chlorobenzene to make a 1 wt % solution in a two-neck round bottom flask equipped with a total reflux condenser. To initiate the bromination reaction 21.80 g dried and purified NBS (N-bromosuccinamide) and 1.0 g AIBN (azobisisobutyronitrile) were added to the flask. The flask was evacuated and refilled with nitrogen three times to deoxygenate the reaction mixture. The reactor was stirred for 1 hour at 70° C. Second, third, and fourth portions of NBS and AIBN (same amount as above) were added to the reactor at intervals of hour. The reactor temperature was maintained at 70° C. When reaction was complete, the solution was concentrated on a rotary evaporator to remove 40-70% of the starting solvent level. The polymer was precipitated from the concentrated solution by the addition of a 10 fold excess of methanol (by volume). The solid polymer was recovered by vacuum filtration. The filtrate was washed with two aliquots of methanol (100 mL for each wash) at room temperature.

What is claimed is:

1. An amino- or phosphino-functionalized block copolymer comprising:
   (a) at least two end blocks A, wherein each end block A is substantially free of amino- or phosphino-functional groups, has a number average molecular weight of from about 1,000 to about 60,000, and has a glass transition temperature of at least 90° C. and is independently selected from the group consisting of polymerized (i) ethylene monomers; (ii) propylene monomers, (iii) styrene and alpha-alkyl styrene monomers having a phenyl ring which is optionally substituted by one or more alkyl groups, and (iv) mixtures of monomers selected from (i) to (iii); and (b) at least one interior block D having a number average molecular weight of from about 1,000 to about 100,000 and comprising on average at least one amino- or phosphino-functionalized polymer unit of formula (I)

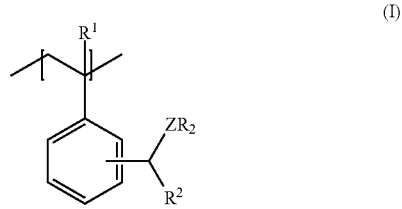

(I)

wherein

Z is nitrogen or phosphorous;

$R^1$ is hydrogen or alkyl;

$R^2$ is hydrogen or is tertiary alkyl;

R each independently, is hydrogen or is alkyl optionally substituted by a moiety $-(A^1-NR^a)_xR^b$; or two R groups, together with the Z to which they are bonded, form an optionally substituted ring;

x is 1, 2 or 3;

$A^1$ is straight chain alkylene optionally substituted by one or more methyl and/or ethyl groups; and $R^a$ and $R^b$, each independently, is hydrogen or alkyl;

or a corresponding onium salt;

wherein the functionalized block copolymer has a wet tensile strength of greater than 100 psi; and wherein the functionalized block copolymer has a ratio of wet tensile strength to dry tensile strength of greater than 0.3.

2. The functionalized block copolymer according to claim 1, wherein from about 10 to 100% of the functional groups of the block(s) D are in form of the onium salt.

3. The functionalized block copolymer according to claim 1, wherein each block D is independently selected from the group consisting of (i) segments derived from homo- and copolymers of styrene having a phenyl ring which is substituted by a primary alkyl group, and (iii) segments derived from homo- and copolymers of alpha-alkyl styrene having a phenyl ring which is substituted by a primary alkyl group.

4. The functionalized block copolymer according to claim 3, wherein on average at least about 5% of the styrene or alpha-alkyl styrene having derived polymer units of each block D, are polymer units of formula (I) or the corresponding onium salt.

5. The functionalized block copolymer according to claim 3, wherein on average from 25 to 100% of the styrene or alpha-alkyl styrene having derived polymer units of each block D, are polymer units of formula (I) or the corresponding onium salt.

6. The functionalized block copolymer according to claim 3, wherein each block D consists of polymer units of formula (1), or the corresponding onium salt, and optionally polymer units derived from one or more monomers selected from the group consisting of styrene and alpha-alkyl styrene in each case having a phenyl ring which is optionally substituted by a primary alkyl group.

7. The functionalized block copolymer according to claim 1, further comprising at least one interior block B, wherein each block B is essentially non-functionalized, has a number average molecular weight of from about 1,000 to about 100,000, and has a glass transition temperature of at most about 20° C.

8. The functionalized block copolymer according to claim 7, wherein each block B is independently selected from the group consisting of polymerized (i) ethylene monomers, (ii) C3-C8 alpha-olefin monomers, (iii) isobutylene monomers, (iv) conjugated diene monomers, and (v) mixtures of monomers selected from (i) to (iv), wherein segments containing polymerized conjugated diene monomers are optionally hydrogenated.

9. The functionalized block copolymer according to claim 7, having a general configuration A-D-A, A-D-A-D-A, (A-D-A)nX, (A-D)nX, A-B-D-B-A, A-D-B-D-A, (A-B-D)nX, (A-D-B)nX, or mixtures thereof, wherein n is an integer from 2 to about 30, and X is a coupling agent residue, and wherein the plurality of A blocks, B blocks, or D blocks are the same or different.

10. A membrane or film comprising the functionalized block copolymer of claim 1, wherein the membrane has a wet tensile strength and a dry tensile strength of greater than 1000 psi.

11. An apparatus selected from the group consisting of fuel cells, filtration devices, devices for controlling humidity, devices for forward electro-dialysis, devices for reverse electro-dialysis, devices for pressure retarded osmosis, devices for forward osmosis, devices for reverse osmosis, devices for selectively adding water, devices for selectively removing water, devices for capacitive deionization, devices for molecular filtration, devices for removing salt from water, devices for treating produced water from hydraulic fracturing applications, devices for ion transport applications, devices for softening water, and batteries, and comprising the membrane or film of claim 10.

12. An electro-deionization assembly comprising at least one anode, at least one cathode, and one or more membrane(s) wherein at least one membrane is the membrane of claim 10.

13. The electro-deionization assembly of claim 12 which comprises at least two membranes wherein at least one membrane is a cation-exchange membrane.

14. The electro-deionization assembly of claim 13 wherein the cation-exchange membrane comprises a sulfonated block copolymer comprising at least two polymer end blocks E and at least one polymer interior block F, wherein each E block contains essentially no sulfonic acid or sulfonated ester functional groups and each F block comprises sulfonation susceptible polymer units and, based on the number of the sulfonation susceptible polymer units, from about 10 to about 100 mol % of sulfonic acid or sulfonate ester functional groups.

* * * * *